United States Patent
Bickham et al.

(10) Patent No.: US 8,842,957 B2
(45) Date of Patent: Sep. 23, 2014

(54) MULTIMODE OPTICAL FIBER AND SYSTEM INCORPORATING SUCH

(75) Inventors: Scott Robertson Bickham, Corning, NY (US); Dana Craig Bookbinder, Corning, NY (US); Xin Chen, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 309 days.

(21) Appl. No.: 13/432,553

(22) Filed: Mar. 28, 2012

(65) Prior Publication Data

US 2013/0077926 A1      Mar. 28, 2013

Related U.S. Application Data

(60) Provisional application No. 61/503,252, filed on Jun. 30, 2011.

(51) Int. Cl.
*G02B 6/02* (2006.01)
*G02B 6/028* (2006.01)

(52) U.S. Cl.
CPC .................................. *G02B 6/0288* (2013.01)
USPC ......................................... 385/124; 385/123

(58) Field of Classification Search
USPC ........................................................ 385/124
See application file for complete search history.

(56) References Cited

U.S. PATENT DOCUMENTS

| | | | |
|---|---|---|---|
| 5,241,615 A * | 8/1993 | Amos et al. ................... 385/126 |
| 7,242,870 B2 * | 7/2007 | Guan et al. ..................... 398/180 |
| 7,315,677 B1 | 1/2008 | Li et al. |
| 7,787,731 B2 | 8/2010 | Bookbinder et al. |
| 8,189,978 B1 | 5/2012 | Bennett et al. |
| 8,644,664 B2 * | 2/2014 | Molin et al. .................... 385/124 |
| 2005/0157995 A1 * | 7/2005 | Guan et al. ..................... 385/123 |
| 2009/0169163 A1 | 7/2009 | Abbott, III et al. |
| 2010/0303428 A1 | 12/2010 | Bickham et al. |
| 2011/0123161 A1 * | 5/2011 | Molin et al. .................... 385/124 |
| 2013/0077926 A1 * | 3/2013 | Bickham et al. ............... 385/124 |

FOREIGN PATENT DOCUMENTS

| EP | 1498753 | 1/2005 |
|---|---|---|
| EP | 1557965 | 7/2005 |
| EP | 2333594 | 6/2011 |

OTHER PUBLICATIONS

Olshansky, R., "Distortion Losses in Cabled Optical Fibers", Applied Optics, vol. 14, No. 1, pp. 20-21, Jan. 1975.
International Search Report issued Sep. 26, 2012 in counterpart application PCT/US12/041977.

(Continued)

*Primary Examiner* — Rhonda Peace
(74) *Attorney, Agent, or Firm* — Svetlana Short

(57) ABSTRACT

According to some embodiments, a multimode optical fiber comprises a graded index glass core with refractive index Δ1, a maximum refractive index delta $\Delta 1_{MAX}$, and a core radius between 10 and 40 microns; and cladding region surrounding the core comprising refractive index Δ4, wherein the fiber exhibits an overfilled bandwidth at an operating wavelength in a 900 to 1250 nm wavelength range of greater than 2.5 GHz-km. According to some embodiments the fiber exhibits an overfilled bandwidth at a wavelength between 950 and 1100 nm which is greater than 4 GHz-km. According to some embodiments the fiber exhibits an overfilled bandwidth at a wavelength between 950 and 1100 nm which is greater than 10 GHz-km.

28 Claims, 9 Drawing Sheets

(56) References Cited

OTHER PUBLICATIONS

Coldren, L.A., "High-Speed Datacom VCSELs at 1310 and 980 nm", ECE and Materials Departments, University of California; www.ece.ucsb.edu/Faculty/Coldren/papers/2007%20Papers/Coldren%20Papers/Coldren%20-%.

Culdien, L.A., "Efficient Sources for Chip-to-Chip to Box-to-Box Communication Within Data Centers", Paper TuD2.1, IEEE Photonics Society Summer Topicals on Optical Networks and Devices for Data Centers (2010).

Donlagic, D., "Opportunities to Enhance Multimode Fiber Links by Application of Overfilled Launch", Journal of Lightwave Technology, vol. 23, No. 11, pp. 3526-3539, Nov. 2005.

Hanson, D., "Case for Using 980 nm (Rather Than 850 nm) VCSELs for Serial 10 Gb/s Links with New Higher-Bandwidth 50 MMF", IEEE 802.3 HSSG Plenary, Meeting, Jul. 5-8, 1999, Montreal, Canada Tuesday, Jun. 29, 1999.

Lenahan, T.A., "Calculation of Modes in an Optical Fiber Using the Finite Element Method and EISPACK", The Bell System Technical Journal, vol. 62, No. 9, pp. 2663-2695.

http://www.thorlabs.com/NewGroupPage11.cfm?ObjectGroup_ID=7.

Coldren, L.A., "High-Speed Datacom VCSELs at 1310 and 980 nm", ECE and Materials Departments, University of California; www.ece.ucsb.edu/Faculty/Coldren/papers/2007%20Papers/Coldren%20-%.

Coldren, L.A., "Efficient Sources for Chip-to-Chip to Box-to-Box Communication Within Data Centers", Paper TuD2.1, IEEE Photonics Society Summer Topicals on Optical Networks and Devices for Data Centers (2010).

Donlagic, D., "Opportunities to Enhance Multimode Fiber Links by Application of Overfilled Launch", Journal of Lightwave Technology, vol. 23, No. II, pp. 3526-3539, Nov. 2005.

Hanson, D., "Case for Using 980 nm (Rather Than 850 nm) VCSELs for Serial 10 Gb/s Links with New Higher-Bandwidth 50 MMF", IEEE 802.3 HSSG Plenary Meeting, Jul. 5-8, 1999, Montreal, Canada Tuesday, Jun. 29, 1999.

Lenahan, T.A., "Calculation of Modes in an Optical Fiber Using the Finite Element Method and EISPACK", The Bell System Technical Journal, vol. 62, No. 9, pp. 2663-2695, 1983.

http://www.thorlabs.com/NewGroupPageII.cfm?ObjectGroup_ID=7.

* cited by examiner ial Application Ser. No. 61/503,
MULTIMODE OPTICAL FIBER AND SYSTEM INCORPORATING SUCH

CROSS-REFERENCE TO RELATED APPLICATION

This application claims the benefit of priority under 35 U.S.C. §119 of U.S. Provisional Application Ser. No. 61/503,252 filed on Jun. 30, 2011, the content of which is relied upon and incorporated herein by reference in its entirety.

BACKGROUND OF THE INVENTION

1. Field of the Invention

The present invention relates generally to optical fibers, and more specifically to multimode optical fibers.

2. Technical Background

Multimode (MM) fibers that operate at the wavelength range centered around 850 nm are known. The bandwidth (BW) of these multimode (MM) fiber is limited mostly by inter-modal chromatic dispersion. To minimize the inter-modal chromatic dispersion, MM fibers are designed with graded index α-profiles. Current high bandwidth (>1 GHz·Km) optical fibers are optimized for use at 850 nm. Some of these MM fibers also have a second operating window, with lower BW (<1 GHz·Km) centered at 1300 nm.

However, some of the limitations of the optical systems that operate at 850 nm and their corresponding of optical fibers nm are: high attenuation (>2 dB/Km), high fiber dispersion (<−90 ps/nm/km), difficulties in producing high bandwidth fiber in manufacturing, and difficulties at achieving high BW fibers at multiple wavelengths.

VCSELs being developed for wavelengths greater than 900 nm for high speed operation and their use provide significant advantages over the 850 nm VCSELS. VCSELs that operate above about 900 nm and below 1250 nm are now available. Some of the advantages for utilizing these longer wavelength VCSELs include supporting Class 1 eye safety specifications, improved source and detector performance, lower optical fiber attenuation, better photon energy conversion, less VCSEL temperature increase, and lower cost. While these VCSELs are being proposed for high speed applications in the 900-1250 nm wavelength range, optical fibers that are optimized for VCSELs at wavelengths greater than 900 nm have not been designed.

SUMMARY OF THE INVENTION

According to some embodiments, a multimode optical fiber comprises a graded index glass core with refractive index Δ1, a maximum refractive index delta $\Delta 1_{MAX}$, and a core radius between 10 and 40 microns; and cladding region surrounding the core comprising refractive index Δ4, wherein the fiber exhibits an overfilled bandwidth at a wavelength in the 900 to 1250 nm wavelength range of greater than 2.5 GHz-km.

According to some embodiments, a multimode optical fiber comprises a graded index glass core with refractive index Δ1, a maximum refractive index delta $\Delta 1_{MAX}$, and a core radius between 20 and 40 microns; and cladding region surrounding the core comprising refractive index Δ4, wherein the fiber exhibits an overfilled bandwidth at a wavelength in the 900 to 1100 nm wavelength range that is greater than 2.5 GHz-km. According to some embodiments the fiber exhibits an overfilled bandwidth at a wavelength in the 950 to 1000 nm range which is greater than 4 GHz-km. According to some embodiments the fiber exhibits an overfilled bandwidth at a wavelength in the 950 to 1000 nm range which is greater than 10 GHz-km. According to some embodiments the fiber exhibits an overfilled bandwidth at a wavelength in the 1030 to 1090 nm range which is greater than 4 GHz-km. According to some embodiments the fiber exhibits an overfilled bandwidth at a wavelength in the 1030 to 1090 nm range which is greater than 10 GHz-km.

According to some embodiments a multimode optical fiber comprises:

(i) a graded index glass core comprising refractive index delta 1, said core comprising a core radius between 10 and 35 microns; and (ii) a depressed index cladding region surrounding said core and comprising refractive index delta Δ3MIN; and (iii) an outer cladding comprising refractive index Δ4. The outer cladding region surrounds the depressed index cladding region. The depressed index cladding region has a refractive index delta less than about −0.1% and a width of at least 1 micron, wherein d Δ1>Δ4>Δ3MIN, and the fiber exhibits an overfilled bandwidth at a wavelength in the 900 to 1250 nm range (preferably the 900 to 1100 nm range) that is greater than 2.5 GHz-km.

According to some embodiments a system comprises:
(i) at least one light source (e.g., VCSEL(s), said light source transmits at a bit rate of 25 GHz or higher at one or more wavelengths between 900 and 1250 nm;
(ii) at least one multimode optical fiber optically coupled to the light source, said fiber comprises a graded index a graded index glass core, and a cladding comprising an outer cladding portion, wherein said fiber has an overfilled bandwidth at an operating wavelength situated in 900 nm to 1250 nm wavelength range greater than 4 GHz-km; an alpha less than about 2.08; and a dispersion magnitude less than 60 ps/nm/km and an attenuation less than 1.5 dB/km at said operating wavelength; and
(iii) a detector optically coupled to said multimode optical fiber and capable of detecting a wavelength in 900 nm to 1250 nm. According to some embodiments the at least one light source is transmits at a bit rate of 40 GHz or higher at one or more wavelengths between 900 and 1250 nm. According to some embodiments the at least one light source is/are VCSEL(s) that operate(s) in 940 to 1250 nm range. According to some embodiments the at least one light source is/are VCSEL(s) that operate(s) inn 940 to 1100 nm range.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1A:
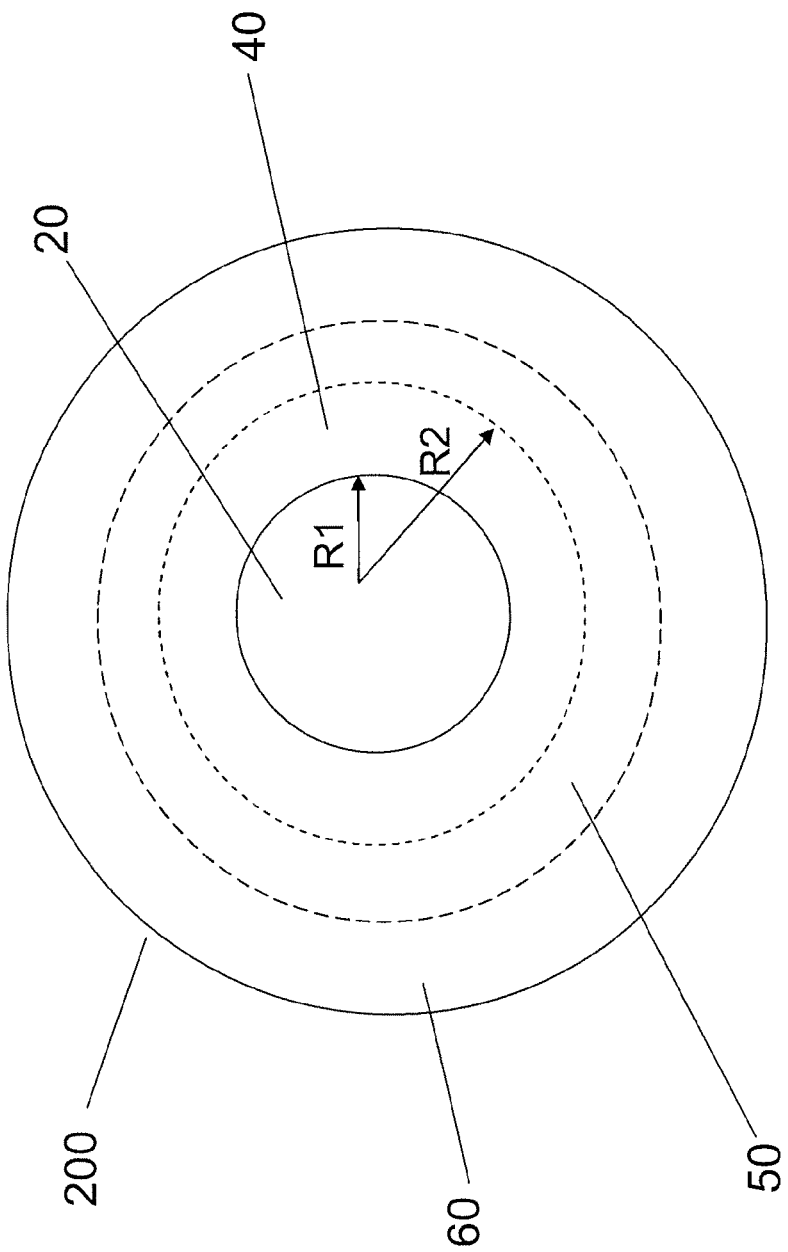
FIG. 1A shows a schematic representation (not to scale) of the a cross-sectional view of the glass portion of an exemplary embodiment of multimode optical fiber.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 980 nm unless otherwise specified. Unless otherwise specified herein, $n_{REF}$ is the average refractive index of the outer annular portion 60 of the cladding, which can be calculated, for example, by taking "N" index measurements ($n_{C1}$, $n_{C2}$, ... $n_{CN}$) in the outer annular portion of the cladding, and calculating the average refractive index by:

$$n_C = (1/N)\sum_{i=1}^{i=N} n_{Ci}.$$

As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Unless otherwise, noted, macrobend performance was determined according to FOTP-62 (IEC-60793-1-47) by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation due to the bending using an overfilled launch condition where the optical source has a spot size that is greater than 50% of the core diameter of the fiber under test. In some measurements, an encircled flux launch (EFL) macrobend performance was obtained by launching an overfilled pulse into an input end of a 2 m length of InfiniCor® 50 micron optical fiber which was deployed with a 1×25 mm diameter mandrel near the midpoint. The output end of the InfiniCor® 50 micron optical fiber was spliced to the fiber under test, and the measured bend loss is the ratio of the attenuation under the prescribed bend condition to the attenuation without the bend.

Unless otherwise stated, bandwidth is measured under overfilled launch conditions at the operating wavelength according to IEC 60793-1-41 (TIA-FOTP-204), Measurement Methods and Test Procedures—Bandwidth.

As used herein, numerical aperture of the fiber means numerical aperture as measured using the method set forth in TIA SP3-2839-URV2 FOTP-177 IEC-60793-1-43 titled "Measurement Methods and Test Procedures-Numerical Aperture".

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is zero unless otherwise specified, $r_1$ is the point at which $\Delta(r)\%$ is zero, and r is in the range $r_i \le r \le r_f$, where $\Delta$ is defined above, $r_i$ is the initial point of the α-profile, $r_f$ is the final point of the α-profile, and α is an exponent which is a real number.

The microbend sensitivity is compared to that of conventional 50 μm MMF, which has a core radius of 25 μm and a relative refractive index of 1%. The microbending sensitivity of a multimode fiber can be estimated by $$\gamma = N < h^2 > \frac{a^4}{b^6 \Delta^3}\left(\frac{E}{E_f}\right)^{3/2}$$

where γ is the microbending induced attenuation increase, N is the number of bumps of average height h per unit length, b is the total fiber diameter, a is the core radius, Δ is the fiber refractive index difference and $E_f$ and E are the elastic moduli of the fiber and the fiber surrounding material (i.e., coating) respectively [Olshansky, R. "Model of Distortion Losses in Cabled Optical Fibers." Appl. Opt., 14, 20 (1975)]. In fibers with the same coating and glass diameter, the microbending sensitivity of a fiber with core radius a (μm) and core delta Δ (%) relative to standard 50 μm MMF is then $$\gamma = \frac{(a/25)^4}{\Delta^3}$$

The microbend sensitivity is preferably less than 10, more preferably less than 5, more preferably less than 2 and still more preferably less than 1. For example, the microbending sensitivity may be less than 0.8, less than 0.6 or less than 0.4.

The depressed-index annular portion has a profile volume, $V_3$, defined herein as:

$$2\int_{R_{INNER}}^{R_{OUTER}} \Delta_3(r) r\, dr$$

where $R_{INNER}$ is the depressed-index annular portion inner radius and $R_{OUTER}$ is the depressed-index annular portion outer radius as defined. For the fibers disclosed herein, the absolute magnitude of $V_3$ is preferably greater than 40%-micron², more preferably greater than 70%-micron², for example: greater than 90%-micron², greater than 80%-micron², greater than 95%-micron², greater than 100%-micron², or greater than 125%-micron². In some preferred embodiments, the absolute magnitude of $V_3$ is greater than 60%-micron² and less than 200%-micron². In other preferred embodiments, the absolute magnitude of $V_3$ is greater than 80%-micron² and less than 160%-micron². In some embodiments the absolute magnitude of $V_3$ is greater than 60%-micron² and less than 200%-micron². In some preferred embodiments, the absolute magnitude of $V_3$ is greater than 80%-micron² and less than 200%-micron². In other preferred embodiments, the absolute magnitude of $V_3$ is greater than 100%-micron² and less than 200%-micron². In other preferred embodiments, the absolute magnitude of $V_3$ is greater than 60%-micron² and less than 120%-micron².

Multimode optical fiber disclosed herein comprises a core and a cladding surrounding and directly adjacent the core. In some embodiments, the core comprises silica doped with germanium, i.e., germania doped silica. Dopants other than germanium such as $Al_2O_3$ or $P_2O_5$, singly or in combination, may be employed within the core, and particularly at or near the centerline, of the optical fiber disclosed herein to obtain the desired refractive index and density. In some embodiments, the refractive index profile of the optical fiber disclosed herein is non-negative from the centerline to the outer radius of the core. In some embodiments, the optical fiber contains no index-decreasing dopants in the core.

FIG. 1A is a schematic representation (not to scale) of a cross-sectional view of one embodiment of the MM optical fiber 100. This exemplary embodiment of a multimode optical fiber 100 comprises a glass core 20 and a glass cladding 200. The cladding may comprise an optional inner annular portion 40, an optional depressed-index annular portion 50, and an outer annular portion 60. Preferably, the core 20 comprises silica doped essentially with a single dopant, for example Ge (i.e., the amount of other dopants being less than 0.5 wt %, and preferably less than 0.1 wt %). Preferably, the core 20 comprises silica with a single dopant, for example Ge.

Figure 1B:
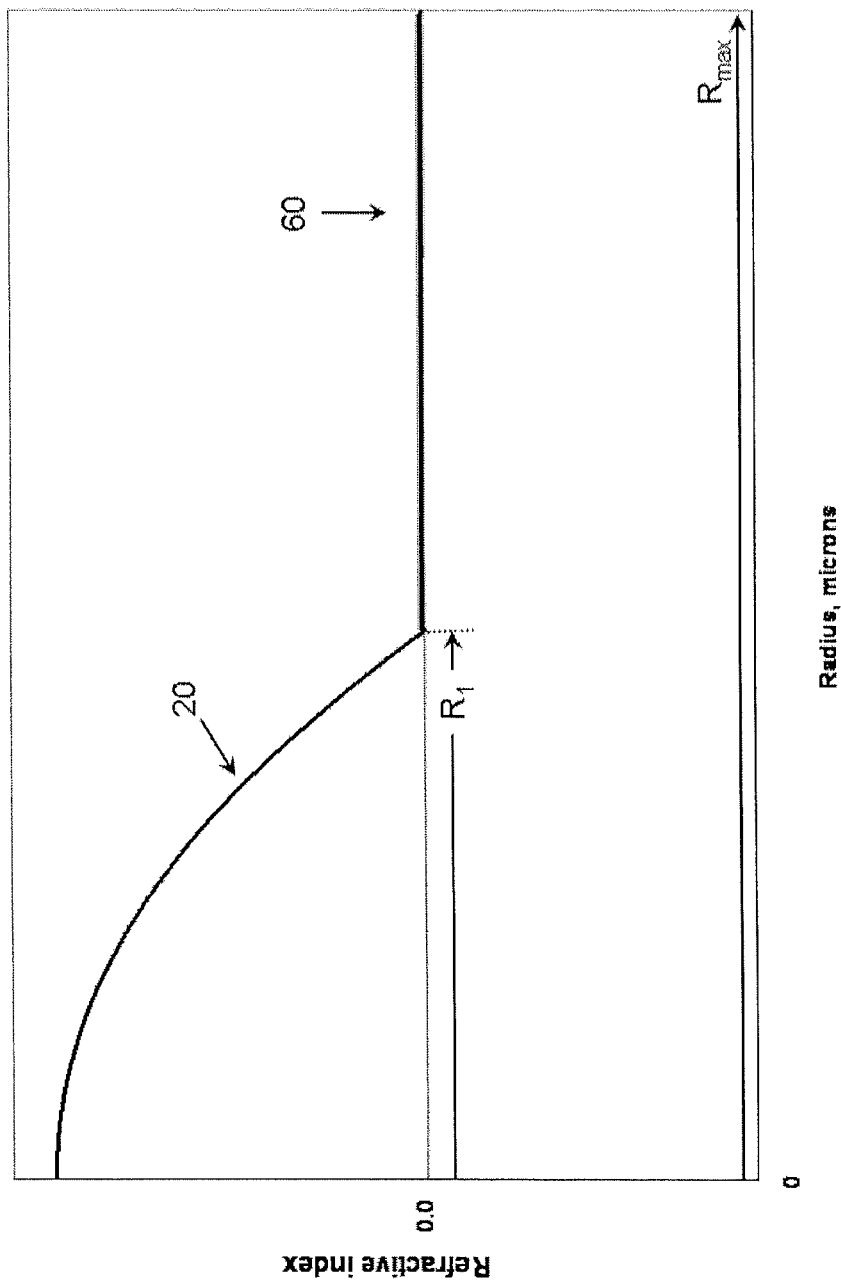
FIG. 1B shows a schematic representation (not to scale) of the refractive index profile of a cross-section of the glass portion of an exemplary embodiment of multimode optical fiber of FIG. 1A.

FIG. 1B illustrates a schematic representation of the refractive index profile of a cross-section of the glass portion of one exemplary embodiment of a multimode optical fiber 100 comprising a glass core 20 and a glass cladding 200, the cladding of this embodiment comprising only an outer annular portion 60. In the embodiment(s) of FIG. 1B, the fiber core 20 has a parabolic shape, the outer radius $R_1$, and maximum refractive index delta $\Delta 1_{MAX}$. The cladding has an outer radius $R_{MAX}$. More specifically, the core delta $\Delta 1_{MAX}$ of FIG. 1A embodiments is between 0.3% and 2%, for example between 0.75% and 1.5% (e.g., 0.75%, 0.8%, 0.9%, 1%, 1.25%, 1.4%, or therebetween) or between 0.3% and 0.75% (e.g., 0.4%, 0.45%, 0.5%, 0.6%, 0.7%, or therebetween). In some exemplary embodiments the core radius $R_1$ is 10 μm to 40 μm, for example 12 to 35 μm. In some exemplary embodiment the core radius $R_1$ is 20 μm to 40 μm, for example 20 μm to 35 μm or 20 μm to 30 μm (for example, 20 to 28 μm, 22 μm to 27 μm, or 30 to 35 μm). In other exemplary embodiment the core radius $R_1$ is 10 μm to 20 μm, for example 10 μm to 15 μm or 15 μm to 20 μm (for example, 10 to 14 μm, 12 μm to 16 μm, or 14 to 18 μm). In one exemplary embodiment the operating wavelength is 900 nm, in another embodiment the operating wavelength is 950 nm. In another exemplary embodiment the operating wavelength is 980 nm. In yet another exemplary embodiment the operating wavelength is 1060 nm.

Preferably the bandwidth BW at the operating (or center) wavelength is greater than 1 GHz·km, more preferably greater than 2 GHz·km, and most preferably greater than 4 GHz·km, for example greater than 10 GHz·km. For example, in some embodiments BW is greater than 4.7 GHz·km, and in other embodiments greater than 12 GHz·km. In some embodiments BW is between 4 GHz·km and 25 GHz·km, for example 4.5 to 20 GHz·km.

It is noted that if the cladding 200 includes optional depressed-index annular portion 50, the fibers 100 can become bend-insensitive. Fiber profiles for such bend insensitive fibers are illustrated, for example, in FIGS. 4, 5A and 5B, and are described in more detail further in the specification.

The bandwidth BW of the MM optical fiber 100 is mostly limited by inter-modal dispersion. To minimize the inter-modal dispersion, the refractive index of the core is designed to have a α-profile. The optimum α is described by the following equation:

$$\alpha_{opt} = 2 + p - \Delta\frac{(4+p)(3+p)}{5+2p}$$

where $$p = \frac{2n_1}{N_1}\frac{\lambda}{\Delta}\frac{d\Delta}{d\lambda},$$

$n_1$ is the refractive index in the center, D is the peak relative refractive index change in the center, and $$N_1 = n_1 - \lambda\frac{dn_1}{\lambda},$$

where λ is 900 nm to 1200 nm. The equation shows that the optimum α depends on the wavelength and the dispersion properties of the core 20.

Figure 2A:
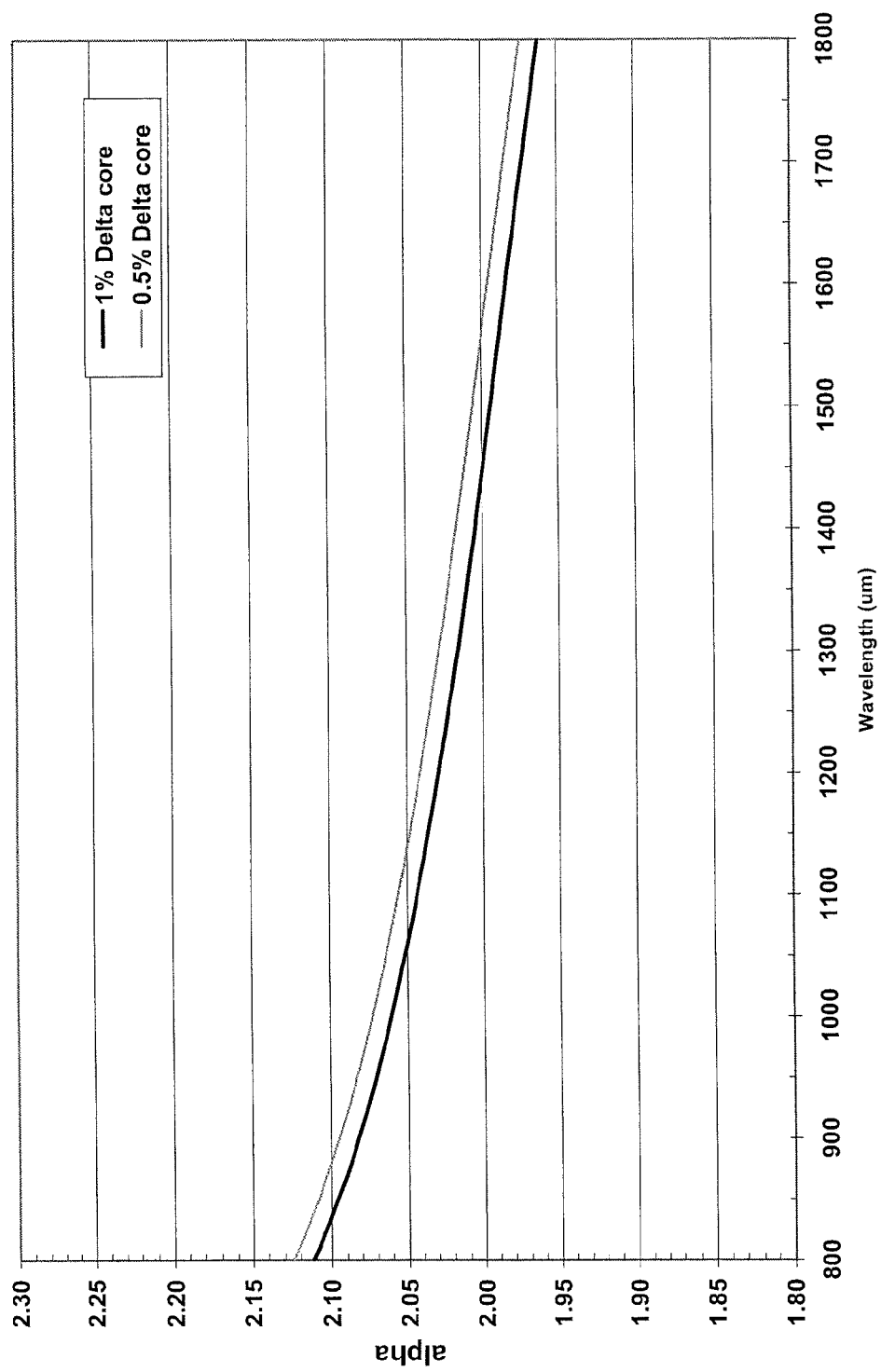
FIG. 2A illustrates sensitivity of the core alpha for optimized bandwidth performance at a given operating wavelength for two graded index MM optical fibers with profiles similar to that shown in FIG. 1A.

According to some embodiments described herein optical fibers 100 are optimized for a bandwidth with a center wavelength λ between 900 nm and 1250 nm, have core deltas between $0.3\% \leq \Delta1_{MAX} \leq 2\%$ (for example, $0.5\% \leq \Delta1_{MAX} \leq 2\%$) and have α of $2.02 \leq \alpha \leq 2.13$. Preferably $2.02 \leq \alpha \leq 2.08$. According to some embodiments described herein optical fibers 100 are optimized for a bandwidth with a center wavelength λ between 900 nm and 1250 nm, and have core deltas between $0.3\% \leq \Delta1_{MAX} \leq 2\%$, and preferably have α values of $2.02 \leq \alpha \leq 2.08$. For example, FIG. 2A illustrates sensitivity of the core alpha for optimized bandwidth performance at a given operating wavelength for two graded index MM optical fibers 100 with profiles similar to that shown in FIG. 1A and the specified $\Delta1_{MAX}$ values of 0.5% and 1%. More specifically, FIG. 2A illustrates that for optical fibers 100 optimized for wavelength between 900 nm and 1250 nm, some embodiments have maximum core deltas between $0.5\% \leq \Delta1_{MAX} \leq 1\%$ and the preferred range for core α values is $2.02 \leq \alpha \leq 2.1$. In other embodiments, optical fibers 100 optimized for wavelength between 900 nm and 1250 nm have maximum core deltas between $0.3\% \leq \Delta1_{MAX} \leq 1\%$ and the preferred range for core α values is $2.02 \leq \alpha \leq 2.08$.

Figure 2B:
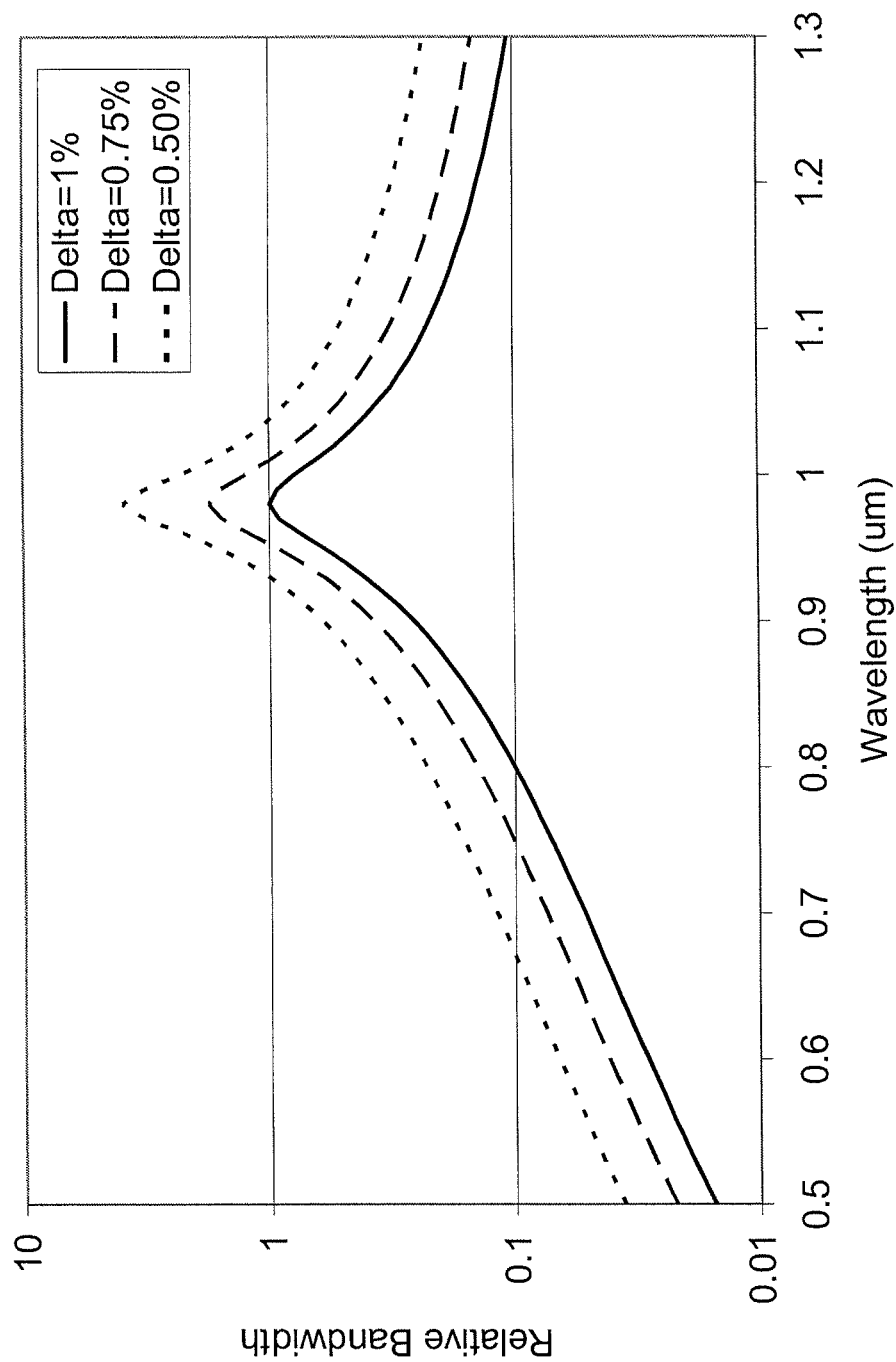
FIG. 2B illustrates bandwidth dependence as a function of core delta for the graded index MM optical fiber of FIG. 1A.

The fiber's bandwidth BW is also a function of the core delta. More specifically, the maximum bandwidth BW increases as the maximum core delta $\Delta1_{MAX}$ decreases. For example, FIG. 2B illustrates bandwidth dependence as a function of core delta for the graded index MM optical fiber 100 of FIG. 1A. It illustrates that for the bandwidths centered on wavelength in 900 nm to 1200 nm, optical fibers 100 with lower $\Delta1_{MAX}$ values produce higher maximum bandwidths.

Figure 3:
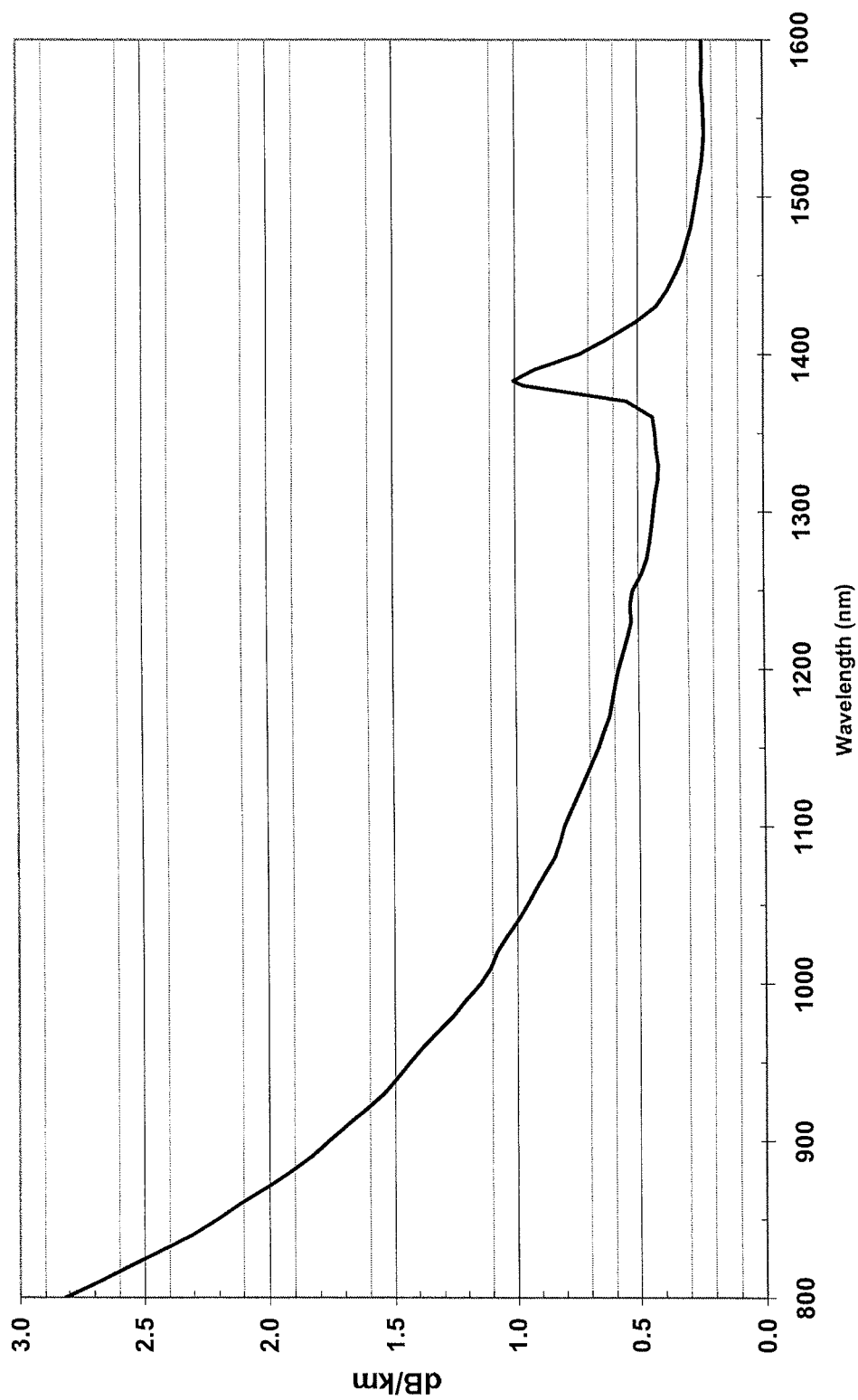
FIG. 3 illustrates spectral attenuation as a function of wavelength for the graded index MM optical fiber of FIG. 1A.

However, the bend loss of the optical fiber 100 increases with decrease in core delta, and the choice of the core delta can be determined by the optimization of the bandwidth and bend loss consideration. As shown in FIG. 2A, the optimum α at any operating wavelength is also a function of the core delta. FIG. 3 illustrates spectral attenuation as a function of wavelength for one exemplary graded index MM optical fiber (with $\Delta1_{MAX}=1\%$) corresponding to FIG. 1A. The multimode optical fiber 100 corresponding to FIG. 3 has lower loss at higher wavelength that result in better system performance at wavelengths greater than 900 nm (e.g., 900 nm to 1200 nm, or 950 nm to 1200 nm).

Figure 4:
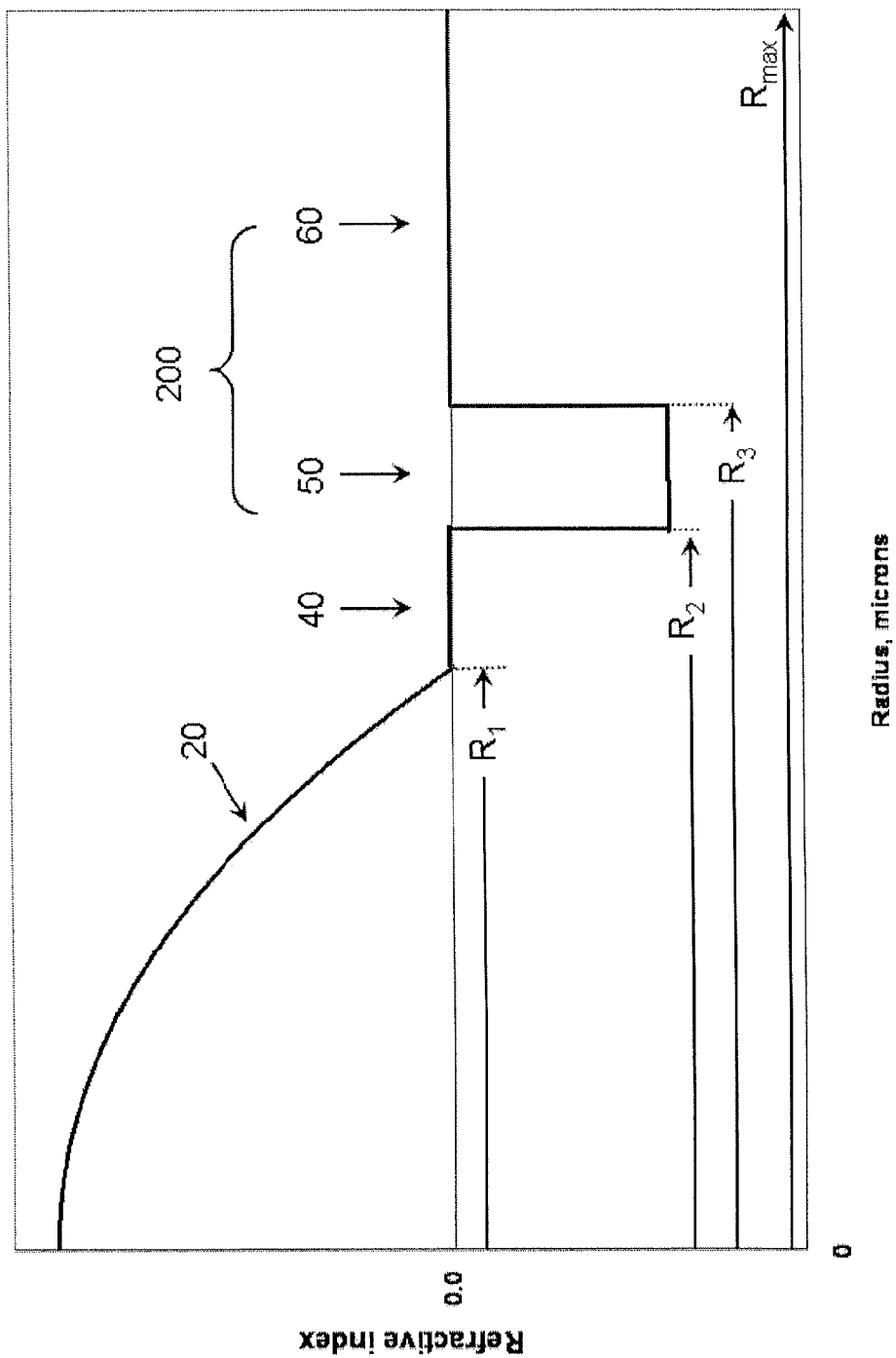
FIG. 4 shows a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.
Figure 5A:
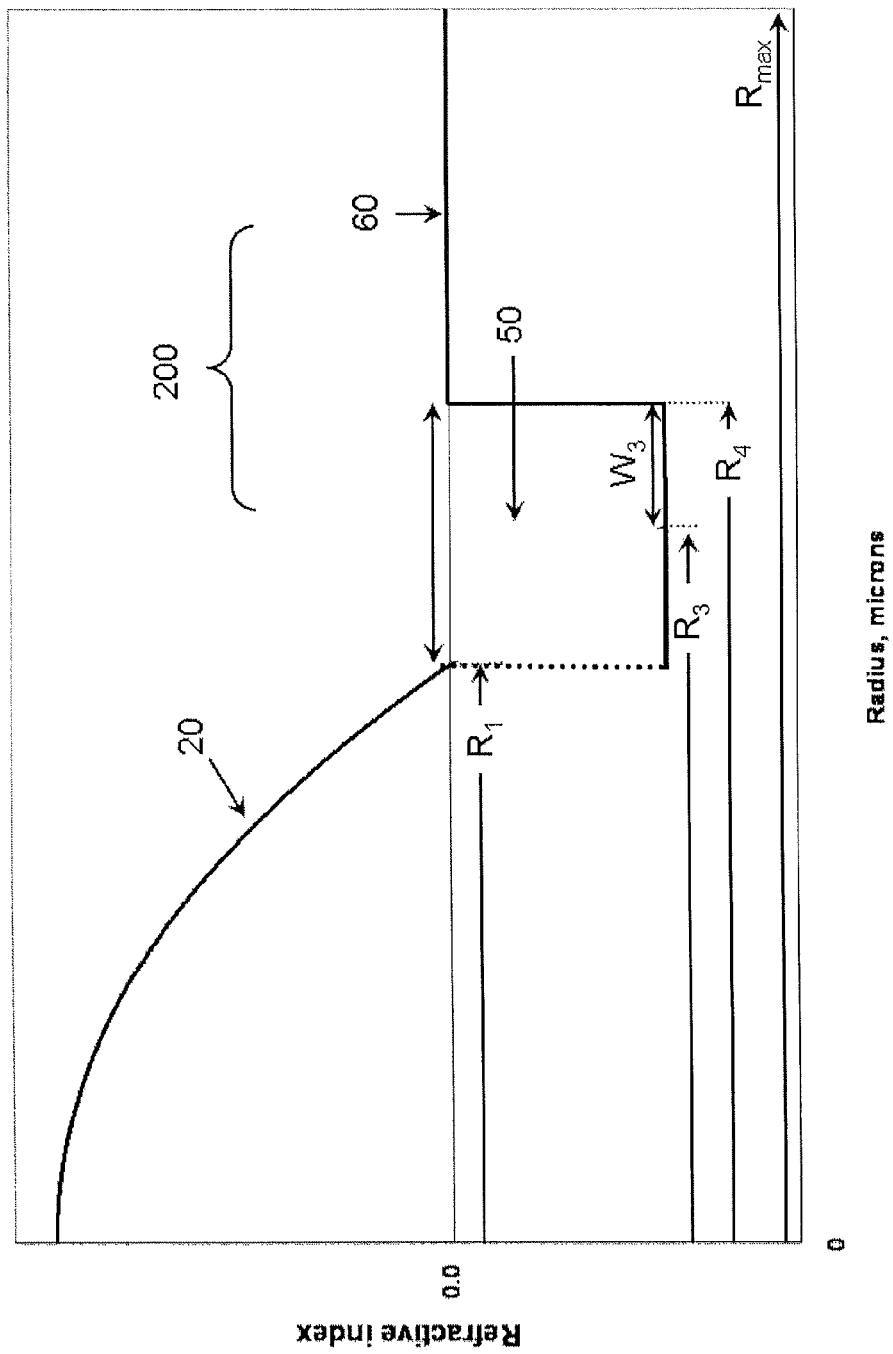
FIG. 5A shows a schematic representation (not to scale) of the refractive index profile of a cross-section of the glass portion of an exemplary embodiment of multimode optical fiber disclosed herein wherein the depressed-index annular portion is not spaced from the core.
Figure 5B:
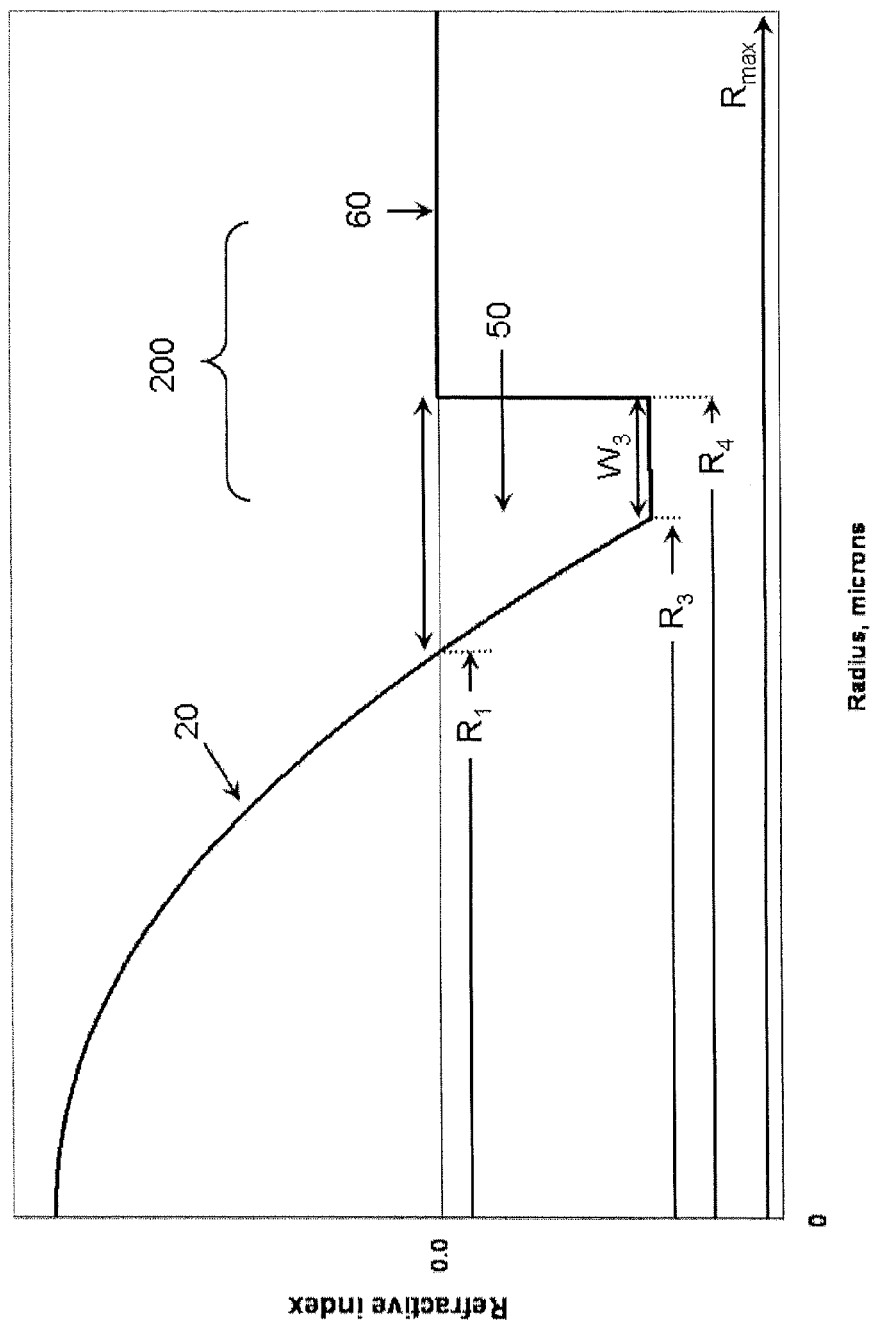
FIG. 5B shows a schematic representation (not to scale) of the refractive index profile of a cross-section of the glass portion of another exemplary embodiment of multimode optical fiber disclosed herein.

The fiber of FIG. 1A has a relatively simple refractive index profile. However the bending performance of this fiber may not be adequate for some applications. To improve the bending performance, we designed optical fibers 100 that have the refractive index profile shown in FIGS. 4, 5A, and 5B. These fibers have a cladding with a depressed-index annular portion 50 (down-doped ring, a cladding region with a low refractive index). The core parameters of fibers of FIGS. 4, 5A, and 5B are similar to the core parameters of the fiber corresponding to FIG. 1A. The core radius $R_1$ is preferably 20 to 30 μm (e.g., 20-28 μm) and preferably α<2.1 (e.g., $2 \leq \alpha < 2.1$, α<2.08, $2.02 \leq \alpha < 2.08$. The depressed-index annular portion 50 has a minimum refractive index $\Delta3_{MIN}$ between −0.1 and −3%, preferably less than −0.3%, more preferably between −0.3 and −1.2%, or between −0.3% and −0.7%. In some embodiments, $\Delta3_{MIN}$ is between −0.5% and −1.2%, or between −0.5% and −1%. In the embodiments of FIG. 4, the width $W_3$ of depressed-index annular portion 50 ($W=R_3-R_2$) is at least 1 micron, preferably between 1 micron and 20 micron, more preferably between 1 and 10 microns more preferably between 1 microns to 5 microns (e.g., 2 to 4.75 microns). The inner annular portion 40 (situated between the core 20 and the depressed-index annular portion 50) is designed such that the difference in time delays for the between the inner and outer mode groups are minimized. Thus, preferably the width of the inner annular portion 40 ($R_2-R_1$) is less than less than 5 microns, more preferably less than 4 microns, more preferably less than 2 microns. By introducing depressed-index annular portion 50 in the profile design, the bending performance of the optical fiber 100 can be improved because the depressed-index annular portion 50 drops the power level effectively. The depressed-index annular portion 50 can be made by F-doping using conventional process such as OVD, MCVD or PCVD. It can also be made by having voids situated within the silica-based glass. The voids can be arranged periodically or randomly.

More specifically, FIG. 4 is a schematic representation of the refractive index profile of a cross-section of the glass portion of one exemplary embodiment of a multimode optical fiber 100 comprising a glass core 20 and a glass cladding 200, the cladding comprising an inner annular portion 40, a depressed-index annular portion 50, and an outer annular portion 60. The core 20 has outer radius $R_1$ and maximum refractive index delta $\Delta1_{MAX}$. The inner annular portion 40 of FIG. 4 fiber is comprised of refractive index delta Δ2 and has width $W_2$ and outer radius $R_2$. Depressed-index annular portion 50 has minimum refractive index delta percent $\Delta3_{MIN}$, width $W_3$ and outer radius $R_3$. The depressed-index annular portion 50 is shown offset, or spaced away, from the core 20 by the inner annular portion 40. In some embodiments, the width of inner annular portion 40 is less than 4.0 microns (e.g., 1 to 3 microns). In some embodiments, $\Delta3_{MIN}$ occurs at radius $R_{3min}$ wherein $R_{3min}-R_1$ is less than 5.0 microns, for example less than 4.0 microns, less than preferably less than 3.0 microns, less than 2.0 microns, or less than 1.0 micron.

The annular portion 50 surrounds inner annular portion 40. The outer annular portion 60 surrounds and contacts the annular portion 50. The inner annular portion 40 has a refractive index profile $\Delta2(r)$ with a maximum relative refractive index $\Delta2_{MAX}$, and a minimum relative refractive index $\Delta2_{MIN}$, where in some embodiments $\Delta2_{MAX}=2_{MIN}$. The depressed-index annular portion 50 has a refractive index profile $\Delta3(r)$ with a minimum relative refractive index $\Delta3_{MIN}$. The outer annular portion 60 has a refractive index profile $\Delta4(r)$ with a maximum relative refractive index $\Delta4_{MAX}$, and a minimum relative refractive index $\Delta4_{MIN}$, where in some embodiments $\Delta4_{MAX}=\Delta4_{MIN}$. Preferably, $\Delta1 > \Delta4 > \Delta3$, and preferably in the embodiments illustrated in FIGS. 1 and 4 $\Delta1_{MAX} > 2\Delta_{MAX} > \Delta3_{MIN}$. In some embodiments, the inner annular portion 40 has a substantially constant refractive index profile, as shown in FIGS. 1 and 4 with a constant $\Delta2(r)$; in some of these embodiments, $\Delta2(r)=0\%$. In some embodiments, the outer annular portion 60 has a substantially constant refractive index profile, as shown in FIG. 4 with a constant $\Delta4(r)$; in some of these embodiments, $\Delta4(r)=0\%$. The core 20 preferably has an entirely positive refractive index profile, where $\Delta1(r)>0\%$. $R_1$ is defined as the radius at which the refractive index delta of the core first reaches value of 0.05%, going radially outwardly from the centerline. Preferably, the core contains substantially no fluorine, and preferably the core contains no fluorine. In some embodiments, the inner annular portion 40 preferably has a relative refractive index profile $\Delta2(r)$ having a maximum absolute magnitude less than 0.05%, and $\Delta2_{MAX}<0.05\%$ and $\Delta2_{MIN}>-0.05\%$, and the depressed-index annular portion 50 begins where the relative refractive index of the cladding first reaches a value of less than −0.05%, going radially outwardly from the centerline. In some embodiments, the outer annular portion 60 has a relative refractive index profile $\Delta4(r)$ having a maximum absolute magnitude less than 0.05%, and $\Delta4_{MAX}<0.05\%$ and $\Delta4_{MIN}>-0.05\%$, and the depressed-index annular portion 50 ends where the relative refractive index of the cladding first reaches a value of greater than −0.05%, going radially outwardly from the radius where $\Delta 3_{MIN}$ is found.

The outer cladding diameter ($2 \times R_{MAX}$) is preferably less than 150 microns, more preferably less than 135 microns, even more preferably less than 130 microns. In some embodiments, the core diameter ($2 \times R_1$) is between 40 and 70 microns, more preferably between 45 and 55 microns, and the outer cladding diameter is between 120 and 140 microns, more preferably between 120 and 130 microns.

In the multimode optical fibers 100 disclosed herein, the core is a graded-index core, and preferably, the refractive index profile of the core has a parabolic (or substantially parabolic) shape; for example, in some embodiments, the refractive index profile of the core has an α-shape with an α value preferably between 1.9 and 2.2, more preferably about 2.1, and even more preferably between about 2.02 and 2.08 as measured at 900 nm; in some embodiments, the refractive index of the core may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core, and the maximum refractive index of the entire optical fiber, is located at the centerline. The parabolic shape extends to a radius $R_1$ and preferably extends from the centerline of the fiber to $R_1$. As used herein, "parabolic" therefore includes substantially parabolically shaped refractive index profiles which may vary slightly from an a value of about 2.05, for example 2.0, or 2.1, at one or more points in the core, as well as profiles with minor variations and/or a centerline dip. Referring to the FIG. 4 embodiment, the inner annular portion 40 is defined to end at the radius $R_1$, which is about where the parabolic shape ends, coinciding with the innermost radius of the cladding 200.

One or more portions of the clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by at least one coating 210, which may in some embodiments comprise a low modulus primary coating and a high modulus secondary coating.

Preferably, the optical fiber disclosed herein has a silica-based core and cladding. In some embodiments, the cladding 200 has an outer diameter, 2 times Rmax, of about 125 μm. In some embodiments, one or more coatings surround and are in contact with the cladding 200. The coating can be a polymer coating such as an acrylate-based polymer.

In some embodiments, the depressed-index annular portion 50 comprises voids, either non-periodically disposed, or periodically disposed, or both. By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. Optical fiber 100 disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber.

In some embodiments, the inner annular portion 40 of the optical fiber 100 (for example, shown in FIG. 4) comprises silica which is substantially undoped with either fluorine or germania. Preferably, the annular portion 40 comprises a width of less than 4.0 microns, more preferably less than 2.0 microns. In some embodiments, the outer annular portion 60 comprises substantially undoped silica, although the silica may contain some amount of chlorine, fluorine, germania, or other dopants in concentrations that collectively do not significantly modify the refractive index. In some embodiments, the depressed-index annular portion 50 comprises silica doped with fluorine and/or boron. In some other embodiments, the depressed-index annular portion 50 comprises silica comprising a plurality of non-periodically disposed voids. The voids can contain one or more gases, such as argon, nitrogen, krypton, $CO_2$, $SO_2$, or oxygen, or the voids can contain a vacuum with substantially no gas; regardless of the presence or absence of any gas, the refractive index in the annular portion 60 is lowered due to the presence of the voids. The voids can be randomly or non-periodically disposed in the annular portion 60 of the cladding 200, and in other embodiments, the voids are disposed periodically in the annular portion 60. Alternatively, or in addition, the depressed index in annular portion 50 can also be provided by down-doping the annular portion 60 (such as with fluorine) or updoping one or more portions of the cladding and/or the core, wherein the depressed-index annular portion 50 is, for example, silica which is not doped as heavily as the inner annular portion 40. Preferably, the minimum relative refractive index, or average effective relative refractive index, such as taking into account the presence of any voids, of the depressed-index annular portion 50 is preferably less than −0.1%, more preferably less than about −0.2 percent, even more preferably less than about −0.3 percent, and most preferably less than about −0.4 percent.

FIG. 5A illustrates a schematic representation of the refractive index profile of a cross-section of the glass portion of an alternative exemplary embodiment of a multimode optical fiber comprising a glass core 20 and a glass cladding 200, the cladding comprising an a depressed-index annular portion 50, and an outer annular portion 60. The core 20 has outer radius $R_1$ and maximum refractive index delta $\Delta 1_{MAX}$. The depressed-index annular portion 50 has minimum refractive index delta percent $\Delta 3_{MIN}$, width $W_3$ and outer radius $R_3$. The depressed-index annular portion 50 surrounds and is in direct contact with the core 20, i.e., there is no inner cladding region 40 (having Δ2) between the core 20 and the depressed-index annular portion 50 (i.e., $R_1 = R_2$). Preferably, $\Delta 1 > \Delta 4 > \Delta 3$. The outer annular portion 60 surrounds and contacts depressed-index annular portion 50. The depressed-index annular portion 50 has a refractive index profile $\Delta 3(r)$ with a minimum relative refractive index $\Delta 3_{MIN}$. The outer annular portion 60 has a refractive index profile Δ4(r) with a maximum relative refractive index $\Delta 4_{MAX}$, and a minimum relative refractive index $\Delta 4_{MIN}$, where in some embodiments $\Delta 4_{MAX} = \Delta 4_{MIN}$. Preferably, $\Delta 1_{MAX} > \Delta 3_{MIN}$. Preferably, the core 20 is doped with germania and contains substantially no fluorine, more preferably the core contains no fluorine. In some embodiments, the depressed-index annular portion 50 begins where the relative refractive index of the cladding first reaches a value of −0.05%, going radially outwardly from the centerline. In some embodiments, the outer annular portion 60 has a relative refractive index profile Δ4(r) having a maximum absolute magnitude less than 0.05%, and $\Delta 4_{MAX} < 0.05\%$ and $\Delta 4_{MIN} > -0.05\%$, and the depressed-index annular portion 50 ends where the relative refractive index of the cladding first reaches a value of −0.05%, going radially outwardly from the radius where $\Delta 3_{MIN}$ is found. Referring to the FIG. 5A, in this embodiment, the core 20 ends at the radius $R_1$ (about where the parabolic shape ends).

FIG. 5B is a schematic representation of the refractive index profile of a cross-section of the glass portion of an alternative exemplary embodiment of a multimode optical fiber comprising a glass core 20 and a glass cladding 200, the cladding comprising an inner annular portion 40, a depressed-index annular portion 50, and an outer annular portion 60. The core 20 has outer radius $R_1$ and maximum refractive index delta $\Delta 1_{MAX}$.

In this embodiment the core 20 also has a parabolic (or substantially parabolic). In some embodiments, the refractive index of the core 20 may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core (and thus maximum refractive index delta $\Delta 1_{MAX}$) and the maximum refractive index of the entire optical fiber 100, is located at the centerline.

The inner annular portion 40 has a refractive index profile Δ2(r) with a maximum relative refractive index $\Delta 2_{MAX}$, and a minimum relative refractive index $\Delta 2_{MIN}$. In this embodiment the parabolic shape of the core extends to outer radius $R_2$ and of the inner annular portion 40 and preferably extends from the centerline of the fiber to $R_2$. Referring to the FIG. 5B embodiments, the inner annular portion 40 of this embodiment(s) is defined to end at the radius $R_2$ where the parabolic shape ends. As used herein, "parabolic" therefore includes substantially parabolically shaped refractive index profiles which may vary slightly from an α value of about 2.05, for example 2.0 to 2.1.

The depressed-index annular portion 50 has minimum refractive index delta percent $\Delta 3_{MIN}$, width $W_3$ and outer radius $R_3$. The depressed-index annular portion 50 surrounds and is in direct contact inner annular portion 40. Preferably, Δ1>Δ4>Δ3. The outer annular portion 60 surrounds and contacts depressed-index annular portion 50. The depressed-index annular portion 50 has a refractive index profile Δ3(r) with a minimum relative refractive index $\Delta 3_{MIN}$. The outer annular portion 60 has a refractive index profile Δ4(r) with a maximum relative refractive index $\Delta 4_{MAX}$, and a minimum relative refractive index $\Delta 4_{MIN}$, where in some embodiments $\Delta 4_{MAX} = \Delta 4_{MIN}$. Preferably, $\Delta 1_{MAX} > \Delta 3_{MIN}$. Preferably, the core 20 is doped with germania and contains substantially no fluorine, more preferably the core contains no fluorine. In some embodiments, the depressed-index annular portion 50 begins where the relative refractive index of the cladding first reaches a value of −0.05%, going radially outwardly from the centerline. In some embodiments, the outer annular portion 60 has a relative refractive index profile Δ4(r) having a maximum absolute magnitude less than 0.05%, and $\Delta 4_{MAX} < 0.05\%$ and $\Delta 4_{MIN} > -0.05\%$, and the depressed-index annular portion 50 ends where the relative refractive index of the cladding first reaches a value of −0.05%, going radially outwardly from the radius where $\Delta 3_{MIN}$ is found.

The depressed-index annular portion 50 can be made by F-doping using conventional process such as OVD, MCVD or PCVD. It can also be made by having voids situated within the silica-based glass. The voids can be arranged periodically or randomly. The inner annular portion 40 can be silica based, made by F-doping using conventional process such as OVD, MCVD or PCVD. It can also be made by having voids situated within the silica-based glass. The voids can be arranged periodically or randomly.

The numerical aperture (NA) of the optical fiber is preferably greater than the NA of the optical source directing signals into the fiber; for example, the NA of the optical fiber is preferably greater than the NA of a VCSEL source. Typical NA values are between 0.185 to 0.31, and in some embodiments are between 0.2 and 0.28.

Set forth below in Table 1 are a variety of modeled examples in accordance with the embodiments of the present invention. Examples 1-14 exhibit refractive index profiles similar to those illustrated by FIG. 4, and similar to those illustrated by FIG. 1A. In particular, provided below are $\Delta 1_{MAX}$ of core region 20, outer radius R1 of core region 20, alpha of core region 20, $\Delta 3_{MIN}$ of depressed index cladding region 50, outer radius R3 of depressed index cladding region 50, profile volume V3 of depressed index cladding region 50, clad radius is the outermost radius of the fiber as well as the outer radius of the outer annular glass cladding portion 60. Also provided is numerical aperture of the fiber. In each case, conventional primary and secondary urethane acrylate based protective coatings were applied to the outside of the glass optical fibers.

TABLE 1

| Parameter | Example 1 | Example 2 | Example 3 | Example 4 | Example 5 | Example 6 | Example 7 |
|---|---|---|---|---|---|---|---|
| $\Delta_{1MAX}$ (%) | 1.0 | 1.0 | 1.0 | 1.0 | 1.0 | 1.0 | 0.9 |
| $R_1$ (micron) | 25 | 25 | 25 | 25 | 25 | 25 | 25 |
| Operating Wavelength (nm) | 900 | 950 | 980 | 980 | 1060 | 980 | 980 |
| Alpha | 2.082 | 2.071 | 2.065 | 2.065 | 2.020 | 2.065 | 2.066 |
| $\Delta_2$ (%) | 0 | 0 | 0 | 0 | 0 | 0 | 0 |
| $R_2$ (micron) | 26.3 | 26.5 | 26.7 | 26.7 | 26.7 | 26.7 | 26.7 |
| $W_2$ (micron) | 1.3 | 1.5 | 1.7 | 1.7 | 1.7 | 1.7 | 1.7 |
| $\Delta_{3MIN}$ (%) | −0.5 | −0.6 | −1.3 | −0.5 | −0.5 | −0.5 | −0.5 |
| $R_3$ (micron) | 29.25 | 29.25 | 29.25 | 29.25 | 29.25 | 31.25 | 31.25 |
| $W_3$ (micron) | 2.95 | 2.75 | 2.55 | 2.55 | 2.55 | 4.55 | 4.55 |

TABLE 1-continued

| | | | | | | | |
|---|---|---|---|---|---|---|---|
| $\Delta_4$ (%) | 0 | 0 | 0 | 0 | 0 | 0 | 0 |
| Rmax (micron) | 62.5 | 62.5 | 62.5 | 62.5 | 62.5 | 62.5 | 62.5 |
| Bend loss, (dB/turn 10 mm diameter) at operating wavelength | 0.28 | 0.25 | 0.07 | 0.33 | 0.33 | 0.15 | 0.18 |
| $V_3$ (%-micron$^2$) | 81.9 | 92.0 | 185.5 | 71.3 | 71.3 | 131.8 | 131.8 |
| NA | 0.206 | 0.207 | 0.221 | 0.204 | 0.204 | 0.213 | 0.203 |
| Dispersion at operating wavelength (ps/nm/km) | −76.5 | −60.4 | −52.1 | −52.1 | −34.2 | −52.1 | −51.3 |
| Attenuation at operating wavelength (dB/km) | 1.45 | 1.17 | 1.03 | 1.03 | 0.75 | 1.03 | 1.03 |
| Peak Bandwidth at operating Wavelength (MHz-km) | >18000 | >18000 | >18000 | >18000 | >18000 | >18000 | >18000 |

| Parameter | Example 8 | Example 9 | Example 10 | Example 11 | Example 12 | Example 13 | Example 14 |
|---|---|---|---|---|---|---|---|
| $\Delta_{1MAX}$ (%) | 1.1 | 1.1 | 1.0 | 1.0 | 1.0 | 2.0 | 2.0 |
| $R_1$ (micron) | 25 | 25 | 15 | 10 | 40 | 25 | 40 |
| Operating Wavelength (nm) | 980 | 980 | 980 | 980 | 980 | 980 | 980 |
| Alpha | 2.064 | 2.064 | 2.065 | 2.065 | 2.065 | 2.050 | 2.050 |
| $\Delta_2$ (%) | 0 | 0 | 0 | 0 | 0 | 0 | 0 |
| $R_2$ (micron) | 26.7 | 26.7 | 16.7 | 11.7 | 41.7 | 26.7 | 41.7 |
| $W_2$ (micron) | 1.7 | 1.7 | 1.7 | 1.7 | 1.7 | 1.7 | 1.7 |
| $\Delta_{3MIN}$ (%) | −0.5 | −0.4 | −0.5 | −0.5 | −0.5 | −0.5 | −0.5 |
| $R_3$ (micron) | 31.25 | 31.25 | 21.7 | 16 | 44.7 | 31.25 | 44.7 |
| $W_3$ (micron) | 4.55 | 4.55 | 5.00 | 4.30 | 3.00 | 4.55 | 3.00 |
| $\Delta_4$ (%) | 0 | 0 | 0 | 0 | 0 | 0 | 0 |
| Rmax (micron) | 62.5 | 62.5 | 62.5 | 62.5 | 62.5 | 62.5 | 62.5 |
| Bend loss, (dB/turn 10 mm diameter) at operating wavelength | 0.12 | 0.17 | <0.2 | <0.3 | <0.3 | <0.1 | <0.1 |
| $V_3$ (%-micron$^2$) | 131.8 | 105.5 | 96.0 | 59.6 | 129.6 | 131.8 | 129.6 |
| NA | 0.224 | 0.220 | 0.218 | 0.213 | 0.223 | 0.30 | 0.30 |
| Dispersion at operating wavelength (ps/nm/km) | −53.0 | −53.0 | −52.3 | −52.3 | −52.3 | −60.3 | −61.4 |
| Attenuation at operating wavelength (dB/km) | 1.03 | 1.03 | 1.03 | 1.03 | 1.03 | 1.03 | 1.03 |
| Peak Bandwidth at operating Wavelength (MHz-km) | >18000 | >18000 | >18000 | >18000 | >18000 | >4500 | >4500 |

The OFL bandwidths of the fibers of Table 1 are greater than 4 GHz-km at the operating wavelength. The macrobend loss at 980 nm on a 10 mm diameter mandrel is less than 0.3 dB/turn (between 0.07 dB/turn and 0.28 dB/turn), and the NA of these fibers is 0.2≤NA≤0.3. The magnitude of the fiber dispersion D is less than 90 ps/nm/km at the operating wavelength, and the fiber attenuation is less than 1.5 dB/km at the operating wavelength.

Set forth below in Table 2 are four modeled fiber examples in accordance with the embodiments of the present invention. Examples 14-17 exhibit refractive index profiles similar to those illustrated by FIG. 4, and similar to those illustrated by FIG. 1A. In particular, provided below are $\Delta_{1MAX}$ of core region 20, outer radius R1 of core region 20, alpha of core region 20, $\Delta_{3MIN}$ of depressed index cladding region 50, outer radius R3 of depressed index cladding region 50, clad radius R4 is the outermost radius of the fiber as well as the outer radius of the outer annular glass cladding portion 60. In the optical fiber embodiments of Table 2, R4=62.5 μm. The exemplary fibers of Table 2 are designed to operate at 940-1100 nm wavelength with a bit rate greater than 4 GHz/km (for example of 40 GHz or higher for a 100 m fiber deployment), and have a dispersion magnitude of less than 60 ps/nm/km at 980 and/or 1060 nm wavelengths and attenuation of less than 1.5 dB/km. It is noted, that the fiber dispersion (LP01 mode) for the fiber embodiments described herein is about 40% lower than the dispersion of the MM fiber optimized for 850 nm, and (when the fiber is optimized for the operating wavelength for 1060 nm) and by 65%. This dispersion reduction will enable longer spans of fiber to be deployed without dispersion limitations, and this is very advantageous for the fiber transmission systems.

TABLE 2

| Parameter | Example 14 | Example 15 | Example 16 | Example 17 |
|---|---|---|---|---|
| $\Delta 1_{MAX}$ (%) | 0.835 | 0.841 | 1.039 | 1.079 |
| $R_1$ (micron) | 23.60 | 23.68 | 23.92 | 23.83 |
| Operating Wavelength (nm) | 1060 | 980 | 1060 | 980 |
| Alpha | 2.064 | 2.049 | 2.062 | 2.046 |
| $\Delta_2$ (%) | −0.02 | −0.02 | 0 | 0 |
| $R_2$ (micron) | 25.08 | 25.13 | 25.41 | 25.33 |
| $W_2$ (micron) | 1.48 | 1.45 | 1.49 | 1.50 |
| $\Delta_{3MIN}$ (%) | −0.48 | −0.4 | −0.44 | −0.44 |
| $R_3$ (micron) | 30 | 29.5 | 30 | 30 |
| $W_3$ (micron) | 4.92 | 4.37 | 4.59 | 4.67 |
| $\Delta_4$ (%) | 0 | 0 | 0 | 0 |
| Rmax (micron) | 62.5 | 62.5 | 62.5 | 62.5 |
| Bend loss, (dB/turn 10 mm diameter) at operating wavelength | <0.3 | <0.3 | <0.3 | <0.3 |
| V3 (%-micron$^2$) | 130.0 | 95.4 | 112.0 | 113.8 |
| NA | 0.189 | 0.190 | 0.211 | 0.215 |
| Dispersion at operating wavelength (ps/nm/km) | −50.9 | −33.3 | −52.7 | −34.9 |
| Attenuation at operating wavelength (dB/km) | 1.03 | 0.75 | 1.03 | 0.75 |
| Peak Bandwidth at operating Wavelength (MHz-km) | 19590 | 19598 | 11893 | 11663 |

Set forth below in Table 3 and Table 4 are fourteen modeled fiber examples in accordance with the embodiments of the present invention. Examples 18-31 exhibit refractive index profiles similar to those illustrated by FIG. 4, and similar to those illustrated by FIG. 1A. In particular, provided below are $\Delta 1_{MAX}$ of core region 20, outer radius R1 of core region 20, alpha of core region 20, $\Delta 3_{MIN}$ of depressed index cladding region 50, outer radius R3 of depressed index cladding region 50, clad radius R4 is the outermost radius of the (uncoated) glass fiber as well as the outer radius of the outer annular glass cladding portion 60. In the optical fiber embodiments of Table 3 and Table 4, R4=62.5 µm, but the smaller core diameter enables smaller values of R4 without impacting the optical properties. For example, the same designs could have R4=120 µm, R4=100 µm, or R4=80 µm. The exemplary fibers of Table 3 and Table 4 are designed to operate at 940-1020 nm wavelength with a bit rate greater than 4 GHz/km (for example of 40 GHz or higher for a 100 m fiber deployment), and have a dispersion magnitude of less than 60 ps/nm/km and an attenuation of less than 1.5 dB/km. The magnitude of the differential group delay between the fastest and slowest mode groups is less than 20 ps/km, and in some embodiments is less than 15 ps/nm and in other embodiments is less than 10 ps/nm. It is noted, that the fiber dispersion (LP01 mode) for the fiber embodiments described herein is about 40% lower than the dispersion of the MM fiber optimized for 850 nm. This dispersion reduction will enable longer spans of fiber to be deployed without dispersion limitations, and this is very advantageous for the fiber transmission systems.

TABLE 3

| Parameter | Example 18 | Example 19 | Example 20 | Example 21 | Example 22 | Example 23 | Example 24 |
|---|---|---|---|---|---|---|---|
| Δ1MAX (%) | 0.42 | 0.51 | 0.59 | 0.33 | 0.40 | 0.49 | 0.60 |
| R1 (micron) | 19.44 | 17.76 | 16.44 | 19.28 | 17.52 | 15.76 | 14.24 |
| Operating Wavelength (nm) | 980 | 980 | 980 | 980 | 980 | 980 | 980 |
| Alpha | 2.069 | 2.069 | 2.069 | 2.069 | 2.069 | 2.070 | 2.068 |
| Δ2 (%) | 0 | 0 | 0 | 0 | 0 | 0 | 0 |
| R2 (micron) | 21.49 | 19.52 | 17.99 | 21.58 | 19.50 | 17.43 | 15.64 |
| W2 (micron) | 2.05 | 1.76 | 1.55 | 2.31 | 1.98 | 1.67 | 1.40 |
| Δ3MIN (%) | −0.42 | −0.42 | −0.42 | −0.42 | −0.42 | −0.42 | −0.42 |
| R3 (micron) | 25 | 24 | 23 | 26.3 | 24 | 22 | 20.3 |
| W3 (micron) | 3.51 | 4.48 | 5.01 | 4.72 | 4.50 | 4.57 | 4.66 |
| Δ4 (%) | 0 | 0 | 0 | 0 | 0 | 0 | 0 |
| Rmax (micron) | 62.5 | 62.5 | 62.5 | 62.5 | 62.5 | 62.5 | 62.5 |
| Microbend sensitivity | 4.97 | 1.94 | 0.90 | 9.73 | 3.72 | 1.32 | 0.48 |
| V3 (%-micron$^2$) | −68.6 | −81.9 | −86.3 | −94.9 | −82.2 | −75.7 | −70.3 |
| NA | 0.133 | 0.147 | 0.159 | 0.118 | 0.130 | 0.145 | 0.160 |
| Dispersion at operating wavelength (ps/nm/km) | −47.5 | −48.2 | −48.8 | −46.8 | −47.3 | −48.0 | −48.9 |
| Attenuation at operating wavelength (dB/km) | 1.03 | 1.03 | 1.03 | 1.03 | 1.03 | 1.03 | 1.03 |
| Peak Bandwidth at operating Wavelength (GHz-km) | 55.3 | 50.2 | 42.8 | 58.6 | 56.4 | 47.9 | 43.8 |
| Differential Group Delay (ps/km) | 12.6 | 13.4 | 16.4 | 9.5 | 11.8 | 13.1 | 12.5 |

TABLE 4

| Parameter | Example 25 | Example 26 | Example 27 | Example 28 | Example 29 | Example 30 | Example 31 |
|---|---|---|---|---|---|---|---|
| $\Delta 1 MAX$ (%) | 0.40 | 0.50 | 0.60 | 0.68 | 0.35 | 0.42 | 0.50 |
| R1 (micron) | 14.88 | 13.16 | 12.10 | 11.40 | 13.22 | 12.11 | 11.12 |
| Operating Wavelength (nm) | 980 | 980 | 980 | 980 | 980 | 980 | 980 |
| Alpha | 2.069 | 2.071 | 2.069 | 2.069 | 2.072 | 2.071 | 2.071 |
| $\Delta 2$ (%) | 0 | 0 | 0 | 0 | 0 | 0 | 0 |
| R2 (micron) | 16.67 | 14.64 | 13.32 | 12.48 | 14.95 | 13.66 | 12.44 |
| W2 (micron) | 1.79 | 1.48 | 1.22 | 1.08 | 1.73 | 1.55 | 1.32 |
| $\Delta 3 MIN$ (%) | −0.39 | −0.4 | −0.39 | −0.39 | −0.35 | −0.4 | −0.4 |
| R3 (micron) | 21.9 | 18.5 | 18 | 17.2 | 18.5 | 17.5 | 16 |
| W3 (micron) | 5.23 | 3.86 | 4.68 | 4.72 | 3.55 | 3.84 | 3.56 |
| $\Delta 4$ (%) | 0 | 0 | 0 | 0 | 0 | 0 | 0 |
| Rmax (micron) | 62.5 | 62.5 | 62.5 | 62.5 | 62.5 | 62.5 | 62.5 |
| Microbend sensitivity | 1.96 | 0.61 | 0.25 | 0.14 | 1.83 | 0.74 | 0.32 |
| V3 (%-micron$^2$) | −78.7 | −51.1 | −57.2 | −54.7 | −41.5 | −47.9 | −40.5 |
| NA | 0.130 | 0.146 | 0.160 | 0.170 | 0.122 | 0.134 | 0.145 |
| Dispersion at operating wavelength (ps/nm/km) | −47.3 | −48.1 | −48.8 | −49.4 | −46.9 | −47.4 | −48.0 |
| Attenuation at operating wavelength (dB/km) | 1.03 | 1.03 | 1.034 | 1.04 | 1.03 | 1.03 | 1.03 |
| Peak Bandwidth at operating Wavelength (GHz-km) | 56.4 | 54.3 | 51.2 | 39.7 | 82.1 | 70.9 | 70.1 |
| Differential Group Delay (ps/km) | 10.7 | 9.2 | 11.8 | 14.8 | 6.7 | 8.4 | 8 |

Set forth below in Table 5 and Table 6 are twelve modeled fiber examples in accordance with the embodiments of the present invention. Examples 32-43 exhibit refractive index profiles similar to those illustrated by FIG. 4, and similar to those illustrated by FIG. 1A. In particular, provided below are $\Delta 1_{MAX}$ of core region 20, outer radius R1 of core region 20, alpha of core region 20, $\Delta 3_{MIN}$ of depressed index cladding region 50, outer radius R3 of depressed index cladding region 50, clad radius R4 is the outermost radius of the fiber as well as the outer radius of the outer annular glass cladding portion 60. In the optical fiber embodiments of Table 5 and Table 6, R4=62.5 μm, but the smaller core diameter enables smaller values of R4 without impacting the optical properties. For example, the same designs could have R4=120 μm, R4=100 μm, or R4=80 μm. The exemplary fibers of Table 5 and Table 6 are designed to operate at 1020-1100 nm wavelength with a bit rate greater than 4 GHz/km (for example of 40 GHz or higher for a 100 m fiber deployment), and have a dispersion magnitude of less than 40 ps/nm/km and an attenuation of less than 1.0 dB/km. The magnitude of the differential group delay between the fastest and slowest mode groups is less than 20 ps/km, and in some embodiments is less than 15 ps/nm and in other embodiments is less than 10 ps/nm. It is noted, that the fiber dispersion (LP01 mode) for the fiber embodiments described herein is about 65% lower than the dispersion of the MM fiber optimized for 850 nm. This dispersion reduction will enable longer spans of fiber to be deployed without dispersion limitations, and this is very advantageous for the fiber transmission systems.

TABLE 5

| Parameter | Example 32 | Example 33 | Example 34 | Example 35 | Example 36 | Example 37 |
|---|---|---|---|---|---|---|
| $\Delta 1 MAX$ (%) | 0.40 | 0.51 | 0.60 | 0.40 | 0.48 | 0.62 |
| R1 (micron) | 21.47 | 18.96 | 17.46 | 18.74 | 17.11 | 15.06 |
| Operating Wavelength (nm) | 1060 | 1060 | 1060 | 1060 | 1060 | 1060 |
| Alpha | 2.054 | 2.053 | 2.054 | 2.055 | 2.053 | 2.053 |
| $\Delta 2$ (%) | 0 | 0 | 0 | 0 | 0 | 0 |
| R2 (micron) | 23.81 | 20.89 | 19.15 | 20.85 | 18.92 | 16.50 |
| W2 (micron) | 2.35 | 1.93 | 1.69 | 2.11 | 1.80 | 1.44 |
| $\Delta 3 MIN$ (%) | −0.44 | −0.44 | −0.44 | −0.39 | −0.39 | −0.39 |
| R3 (micron) | 28.5 | 25 | 23.5 | 25.8 | 24 | 22 |
| W3 (micron) | 4.69 | 4.11 | 4.35 | 4.95 | 5.08 | 5.50 |
| $\Delta 4$ (%) | 0 | 0 | 0 | 0 | 0 | 0 |
| Rmax (micron) | 62.5 | 62.5 | 62.5 | 62.5 | 62.5 | 62.5 |
| Microbend sensitivity | 8.48 | 2.47 | 1.10 | 4.95 | 1.98 | 0.55 |
| V3 (%-micron$^2$) | −107.9 | −83.0 | −81.6 | −90.0 | −85.1 | −82.5 |
| NA | 0.130 | 0.147 | 0.160 | 0.130 | 0.143 | 0.162 |
| Dispersion at operating wavelength (ps/nm/km) | −30.4 | −31.1 | −31.7 | −30.4 | −30.9 | −31.8 |

TABLE 5-continued

| Parameter | Example 32 | Example 33 | Example 34 | Example 35 | Example 36 | Example 37 |
|---|---|---|---|---|---|---|
| Attenuation at operating wavelength (dB/km) | 0.75 | 0.75 | 0.76 | 0.75 | 0.75 | 0.76 |
| Peak Bandwidth at operating Wavelength (GHz-km) | 52.6 | 43.1 | 37.4 | 54.9 | 52.2 | 37.2 |
| Differential Group Delay (ps/km) | 11.8 | 15.3 | 17.4 | 10.4 | 12.2 | 17.9 |

TABLE 6

| Parameter | Example 38 | Example 39 | Example 40 | Example 41 | Example 42 | Example 43 |
|---|---|---|---|---|---|---|
| Δ1MAX (%) | 0.40 | 0.50 | 0.59 | 0.34 | 0.42 | 0.48 |
| R1 (micron) | 16.06 | 14.38 | 13.30 | 14.42 | 12.99 | 12.18 |
| Operating Wavelength (nm) | 1060 | 1060 | 1060 | 1060 | 1060 | 1060 |
| Alpha | 2.053 | 2.053 | 2.053 | 2.055 | 2.055 | 2.055 |
| Δ2 (%) | 0 | 0 | 0 | 0 | 0 | 0 |
| R2 (micron) | 18.05 | 16.01 | 14.72 | 16.30 | 14.67 | 13.67 |
| W2 (micron) | 1.99 | 1.63 | 1.42 | 1.88 | 1.68 | 1.49 |
| Δ3MIN (%) | −0.42 | −0.42 | −0.42 | −0.35 | −0.4 | −0.4 |
| R3 (micron) | 23 | 21.5 | 20 | 19 | 18 | 17.5 |
| W3 (micron) | 4.95 | 5.49 | 5.28 | 2.70 | 3.33 | 3.83 |
| Δ4 (%) | 0 | 0 | 0 | 0 | 0 | 0 |
| Rmax (micron) | 62.5 | 62.5 | 62.5 | 62.5 | 62.5 | 62.5 |
| Microbend sensitivity | 2.66 | 0.86 | 0.40 | 2.78 | 0.99 | 0.50 |
| V3 (%-micron$^2$) | −85.4 | −86.5 | −77.0 | −33.3 | −43.5 | −47.7 |
| NA | 0.130 | 0.146 | 0.158 | 0.120 | 0.133 | 0.143 |
| Dispersion at operating wavelength (ps/nm/km) | −30.4 | −31.0 | −31.5 | −30.0 | −30.5 | −30.9 |
| Attenuation at operating wavelength (dB/km) | 0.75 | 0.76 | 0.76 | 0.75 | 0.76 | 0.76 |
| Peak Bandwidth at operating Wavelength (GHz-km) | 58.7 | 51.8 | 45.6 | 110.0 | 78.8 | 74.4 |
| Differential Group Delay (ps/km) | 9.5 | 11.6 | 11.4 | 5 | 7.1 | 8.1 |

Figure 6:
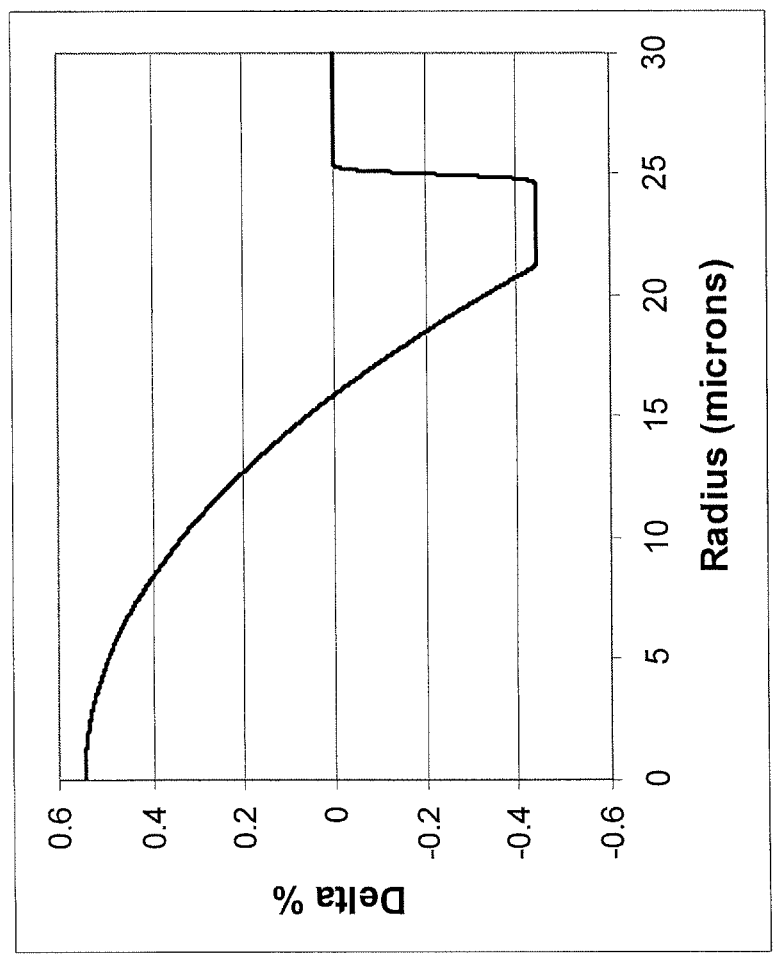
FIG. 6 shows a schematic representation (not to scale) of the refractive index profile of a cross-section of the glass portion of another exemplary embodiment of multimode optical fiber disclosed herein.

Set forth below in Table 7 are five modeled fiber examples in accordance with the embodiments of the present invention. Examples 44-48 exhibit refractive index profiles similar to those illustrated by FIG. 6, wherein the depressed-index annular portion is a continuation of the graded index core and is surrounded by an outer annular portion. In particular, provided below are $\Delta 1_{MAX}$ of core region 20, outer radius R1 of core region 20, alpha of core region 20, $\Delta 3_{MIN}$ of depressed index cladding region 50, outer radius R3 of depressed index cladding region 50, clad radius R4 is the outermost radius of the fiber as well as the outer radius of the outer annular glass cladding portion 60. In the optical fiber embodiments of Table 7, R4=62.5 μm, but the smaller core diameter enables smaller values of R4 without impacting the optical properties. For example, the same designs could have R4=120 μm, R4=100 μm, or R4=80 μm. The exemplary fibers of Table 7 are designed to operate at 1020-1100 nm wavelength with a bit rate greater than 4 GHz/km (for example of 40 GHz or higher for a 100 m fiber deployment), and have a dispersion magnitude of less than 40 ps/nm/km and an attenuation of less than 1.0 dB/km. The magnitude of the differential group delay between the fastest and slowest mode groups is less than 20 ps/km, and in some embodiments is less than 15 ps/nm and in other embodiments is less than 10 ps/nm. It is noted, that the fiber dispersion (LP01 mode) for the fiber embodiments described herein is about 65% lower than the dispersion of the MM fiber optimized for 850 nm. This dispersion reduction will enable longer spans of fiber to be deployed without dispersion limitations, and this is very advantageous for the fiber transmission systems.

TABLE 7

| Parameter | Example 44 | Example 45 | Example 46 | Example 47 | Example 48 |
|---|---|---|---|---|---|
| Δ1MAX (%) | 0.52 | 0.52 | 0.52 | 0.61 | 0.55 |
| R1 (micron) | 11.71 | 11.73 | 14.08 | 12.95 | 15.91 |
| Operating Wavelength (nm) | 1060 | 1060 | 1060 | 1060 | 1060 |

TABLE 7-continued

| Parameter | Example 44 | Example 45 | Example 46 | Example 47 | Example 48 |
|---|---|---|---|---|---|
| Alpha | 2.052 | 2.050 | 2.049 | 2.048 | 2.049 |
| Δ2MIN (%) | −0.28 | −0.37 | −0.42 | −0.38 | −0.44 |
| R2 (micron) | 14.45 | 15.25 | 18.8 | 16.4 | 21.2 |
| W2 (micron) | 2.74 | 3.52 | 4.72 | 3.45 | 5.29 |
| Δ3MIN (%) | −0.28 | −0.37 | −0.42 | −0.38 | −0.44 |
| R3 (micron) | 18.5 | 18.9 | 23 | 19 | 25 |
| W3 (micron) | 4.05 | 3.65 | 4.20 | 2.60 | 3.80 |
| Δ4 (%) | 0 | 0 | 0 | 0 | 0 |
| Rmax (micron) | 62.5 | 62.5 | 62.5 | 62.5 | 62.5 |
| Microbend sensitivity | 0.34 | 0.35 | 0.72 | 0.32 | 0.99 |
| V3 (%-micron$^2$) | −47.6 | −63.9 | −106.9 | −54.5 | −121 |
| NA | 0.149 | 0.149 | 0.149 | 0.161 | 0.153 |
| Dispersion at operating wavelength (ps/nm/km) | −30.5 | −30.9 | −30.9 | −31.5 | −31.2 |
| Attenuation at operating wavelength (dB/km) | 0.76 | 0.76 | 0.76 | 0.76 | 0.76 |
| Peak Bandwidth at operating Wavelength (GHz-km) | 51.0 | 93.2 | 78.5 | 54.0 | 60.6 |
| Differential Group Delay (ps/km) | 9.5 | 4.7 | 6.7 | 11.3 | 9.9 |

Set forth below in Table 8 are five modeled fiber examples in accordance with the embodiments of the present invention. Examples 49-53 exhibit refractive index profiles similar to those illustrated by FIG. 6, wherein the depressed-index annular portion is a continuation of the graded index core and is surrounded by an outer annular portion. In particular, provided below are $\Delta 1_{MAX}$ of core region 20, outer radius R1 of core region 20, alpha of core region 20, $\Delta 3_{MIN}$ of depressed index cladding region 50, outer radius R3 of depressed index cladding region 50, clad radius R4 is the outermost radius of the fiber as well as the outer radius of the outer annular glass cladding portion 60. In the optical fiber embodiments of Table 8, R4=62.5 μm, but the smaller core diameter enables smaller values of R4 without impacting the optical properties. For example, the same designs could have R4=120 μm, R4=100 μm, or R4=80 μm. The exemplary fibers of Table 8 are designed to operate at 940-1020 nm wavelength with a bit rate greater than 4 GHz/km (for example of 40 GHz or higher for a 100 m fiber deployment), and have a dispersion magnitude of less than 60 ps/nm/km and an attenuation of less than 1.5 dB/km. The magnitude of the differential group delay between the fastest and slowest mode groups is less than 20 ps/km, and in some embodiments is less than 15 ps/nm and in other embodiments is less than 10 ps/nm. It is noted, that the fiber dispersion (LP01 mode) for the fiber embodiments described herein is about 40% lower than the dispersion of the MM fiber optimized for 850 nm. This dispersion reduction will enable longer spans of fiber to be deployed without dispersion limitations, and this is very advantageous for the fiber transmission systems.

TABLE 8

| Parameter | Example 48 | Example 49 | Example 50 | Example 51 | Example 52 |
|---|---|---|---|---|---|
| Δ1MAX (%) | 0.43 | 0.50 | 0.57 | 0.46 | 0.51 |
| R1 (micron) | 12.00 | 11.06 | 12.45 | 13.79 | 13.12 |
| Operating Wavelength (nm) | 980 | 980 | 980 | 980 | 980 |
| Alpha | 2.067 | 2.068 | 2.067 | 2.066 | 2.067 |
| Δ2MIN (%) | −0.32 | −0.35 | −0.35 | −0.43 | −0.35 |
| R2 (micron) | 15.7 | 14.3 | 15.7 | 18.98 | 16.9 |
| W2 (micron) | 3.70 | 3.24 | 3.25 | 5.19 | 3.78 |
| Δ3MIN (%) | −0.32 | −0.35 | −0.35 | −0.43 | −0.35 |
| R3 (micron) | 19 | 18.5 | 19 | 23.5 | 21 |
| W3 (micron) | 3.30 | 4.20 | 3.30 | 4.52 | 4.10 |
| Δ4 (%) | 0 | 0 | 0 | 0 | 0 |
| Rmax (micron) | 62.5 | 62.5 | 62.5 | 62.5 | 62.5 |
| Microbend sensitivity | 0.67 | 0.31 | 0.33 | 0.95 | 0.57 |
| V3 (%-micron$^2$) | −53.2 | −62.9 | −56.3 | −119.7 | −74.5 |
| NA | 0.135 | 0.146 | 0.156 | 0.140 | 0.147 |
| Dispersion at operating wavelength (ps/nm/km) | −47.3 | −47.7 | −48.3 | −47.5 | −47.9 |
| Attenuation at operating wavelength (dB/km) | 1.03 | 1.03 | 1.03 | 1.03 | 1.03 |
| Peak Bandwidth at operating Wavelength (GHz-km) | 131.8 | 59.3 | 51.0 | 92.8 | 62.1 |
| Differential Group Delay (ps/km) | 2.5 | 7.6 | 9.8 | 6.2 | 8.1 |

In another modeled example, a multimode fiber has a core with the relative refractive index delta Δ1MAX of 0.7%, R1 of 25 microns, and alpha of 2.07. This fiber is predicted to have overfilled bandwidths of 13.5 GHz·km at 980 nm and 4.3 GHz·km at 1060 nm. A fiber made according to this design can be used at different or at multiple wavelengths, for example either 980 or 1060 nm, or both 980 and 1060 nm. This exemplary fiber has a higher bandwidth at 980 nm than at 1060 nm, but the bandwidth is still greater than 4 GHz-km at both wavelengths, as well as for all wavelengths in the range between 950 and 1100 nm. Decreasing the alpha value to 2.05 while keeping the other design parameters fixed would result in a higher bandwidth at 1060 nm than at 980 nm, with both values being greater than 4.0 GHz-km. The design choice can be applicable to a range of MMF parameters for example, Δ1MAX (%) between 0.3-3% and R1 between 10 and 40 microns.

The fibers of Tables 1 through 8 are suitable for use in an optical transmission system. According to one embodiment, the system 200 comprises: (i) at least one light source (e.g., VCSEL 205), wherein the light source (e.g., VCSEL 205) transmits at a bit rate of 25 GHz or higher (and preferably, according to some embodiments, at 40 GHz or higher (i.e., greater than 4 GHz/km)) at one or more wavelengths between 900 and 1250 nm (e.g., between 940 and 1100 nm); (ii) at least one multimode optical fiber 100; and (iii) a detector 210. The detector is optically coupled to the multimode optical fiber 100 and capable of detecting a wavelength in 900 nm to 1250 nm. The optical fiber 100 comprises a graded index a graded index glass core, an inner cladding region surrounding said core and an outer cladding, and has an overfilled bandwidth at an operating wavelength situated in the 900 nm to 1250 nm wavelength range greater than 4 GHz-km; an alpha less than about 2.08; and a dispersion magnitude less than 60 ps/nm/km and an attenuation less than 1.5 dB/km at the operating wavelength. In some embodiments, for example, the light source (e.g., VCSEL 205, or a laser, etc) transmits at a bit rate of 30 GHz, in some embodiments 35 GHz or 37 GHz, in some embodiments 40, GHz and in some embodiments 45 GHz. Some embodiments of fiber have an overfilled bandwidth greater than 4.7 GHz-km at one or more wavelengths between 940 and 1100 nm, and some embodiments of fiber have an overfilled bandwidth greater than 4 GHz-km at all wavelengths between 950 and 1010 nm; and some embodiments of fiber have an overfilled bandwidth greater than 4 GHz-km at all wavelengths between 1030 and 1090 nm. It is noted that light sources other than VCSELS may also be utilized, for example, Si-lasers operating at a wavelength of 1250 nm.

One embodiment of such system comprises, for example: (i) at least one VCSEL, the VCSEL transmitting at a bit rate of 25 GHz or higher (and preferably, according to some embodiments) at 40 GHz or higher (i.e., greater than 4 GHz/km)) at one or more wavelengths between 940 and 1100 nm; (ii) a multimode optical fiber optical fiber 100; and (iii) a detector. The fiber 100, for example, comprises a graded index glass core; an inner cladding surrounding and in contact with the core, and a second cladding comprising a depressed-index annular portion surrounding the inner cladding, said depressed-index annular portion having a refractive index delta less than about −0.2% and a width of at least 1 micron, wherein said core has a radius greater than 20 microns and less than 28 microns, a maximum refractive index between 0.8 and 1.3%, and an alpha less than about 2.08; and wherein. The fiber 100 has, at one or more wavelengths between 940 and 1100 nm, an overfilled bandwidth greater than 4.7 GHz-km, a dispersion magnitude less than 60 ps/nm/km and an attenuation less than 1.5 dB/km.

The above described system embodiment has the following advantages: energy efficiency and bit rate. The VCSELs operating at 980 nm require only about 43% of the electrical current of 850 nm VCSELs, while 1060 nm VCSELs require only about 21% of the electrical current. Electrical power consumption is a serious problem in modern data centers, and longer systems that utilized longer wavelength (≥950 nm) light sources such as VCSELs (≥950 nm) in conjunction with the optical fiber 100 would mitigate some of energy consumption problems faced by the transmission systems operating at 850 nm. In addition, there appear to be significant hurdles to increasing the speed of the systems above 35 GHz-km if the of operation wavelength of the transmission system is about 850 nm. Utilizing longer wavelength light sources (≥950 nm), for example VCSELs based on In—Ga—As semiconductors, in conjunction with the optical fiber 100 enables a transmission system with significantly higher transmission speeds (for example, ≥20 GHz-km, or ≥25 GHz-km, or ≥35 GHz-km, or even ≥40 GHz-km) than what is currently available.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A multimode optical fiber comprising:
a graded index glass core comprising refractive index delta Δ1, a maximum refractive index delta $\Delta 1_{MAX}$, said core comprising a core radius between 10 and 35 microns; and a depressed index cladding region surrounding said core and comprising refractive index delta Δ3 and a minimum refractive index delta $\Delta 3_{MIN}$, and an outer cladding comprising refractive index Δ4, said outer cladding region surrounding said depressed index cladding region, said depressed index cladding region having a refractive index delta less than about −0.1% and a width of at least 1 micron, wherein $\Delta 1 > \Delta 4 > \Delta 3_{MIN}$, and wherein said fiber exhibits an overfilled bandwidth at 900 nm to 1200 nm range greater than 2.5 GHz-km.

2. The fiber of claim 1, wherein said core comprises silica doped with essentially a single dopant.

3. The fiber of claim 1, wherein said core comprises silica doped with Ge, and no other dopants in the amount greater than 1 wt %.

4. The fiber of claim 1, wherein said fiber exhibits an overfilled bandwidth at a wavelength situated in 900 nm-1100 nm which is greater than 4 GHz-km.

5. The fiber of claim 1 wherein:
said radius is between 10 and 30 microns; and wherein said fiber exhibits an overfilled bandwidth at a wavelength in the 900 nm to 1100 nm range greater than 2.5 GHz-km.

6. The fiber of claim 5, wherein said fiber exhibits an overfilled bandwidth at 980 nm which is greater than 4 GHz-km.

7. The fiber of claim 5, wherein said fiber exhibits an overfilled bandwidth which is greater than 4 GHz-km at all wavelengths between 950 and 1010 nm.

8. The fiber of claim 5, wherein said fiber exhibits an overfilled bandwidth at 1060 nm which is greater than 4 GHz-km.

9. The multimode fiber of claim 5, wherein said fiber exhibits an overfilled bandwidth which is greater than 4 GHz-km at all wavelengths between 1030 and 1090 nm.

10. The multimode fiber of claim 1, wherein said depressed index cladding region is directly adjacent the core and has a refractive index delta is not larger than about −0.2% and a width of at least 2 microns.

11. The multimode fiber of claim 1 further comprising a second inner cladding region comprising Δ4, wherein Δ1>Δ4>Δ3, and said second inner cladding region is less than 2 microns wide.

12. The multimode fiber of claim 1, wherein said core comprises a core radius between 20 and 30 microns.

13. The multimode fiber of claim 1, wherein said core comprises a core radius between 10 and 20 microns.

14. The multimode fiber of claim 1, wherein said fiber exhibits an overfilled bandwidth at 980 nm which is greater than 4 GHz-km.

15. The multimode fiber of claim 1, wherein said fiber exhibits an overfilled bandwidth at 1060 nm which is greater than 4 GHz-km.

16. The fiber of claim 1, wherein said fiber further exhibits a 1 turn 15 mm diameter mandrel wrap attenuation increase, of less than or equal to 0.3 dB/turn at 980 nm.

17. The multimode fiber of claim 1, wherein said fiber exhibits a numerical aperture between 0.12 and 0.24.

18. The multimode fiber of claim 1, wherein the maximum refractive index delta $\Delta 1_{MAX}$ is 0.75% to 1.5%.

19. The multimode fiber of claim 1, wherein the maximum refractive index delta $\Delta 1_{MAX}$ is 0.3% to 0.75%.

20. The multimode fiber of claim 19, wherein said inner annular portion is situated between said core and said depressed index cladding region.

21. The multimode fiber of claim 1, wherein said depressed index region has volume $V_3$ and 60%-micron$^2 \leq V_3 \leq$ 200%-micron$^2$.

22. The multimode fiber of claim 1, wherein $V_3 \leq$ 120%-micron$^2$.

23. The multimode fiber of claim 1, wherein said core has an alpha value of 2.02 to 2.08.

24. The multimode fiber of claim 1, wherein said depressed index region has refractive index delta $\Delta 3_{MIN}$ between −0.1% and −3%.

25. The multimode fiber of claim 24, wherein said depressed index region has refractive index delta $\Delta 3_{MIN}$ between −0.1% and −0.7%.

26. The multimode fiber of claim 1, wherein said fiber further comprises an inner annular portion with a maximum refractive index delta percent $\Delta 2_{MAX}$, and $\Delta 2_{MAX} <$ 0.05%.

27. A system comprising:
   (i) at least light source transmitting at a bit rate of 25 GHz or higher at one or more wavelengths between 900 and 1200 nm;
   (ii) at least one multimode optical fiber according to claim 1, said optical fiber being optically coupled to said light source, wherein said fiber has an overfilled bandwidth at an operating wavelength situated in 900 nm to 1200 nm wavelength range greater than 4 GHz-km; an alpha less than about 2.08; and a dispersion magnitude less than 60 ps/nm/km and an attenuation less than 1.5 dB/km at said operating wavelength; and
   (iii) a detector optically coupled to said multimode optical fiber and capable of detecting a wavelength in 900 nm to 1200 nm.

28. A system comprising:
   (i) at least light source transmitting at a bit rate of 25 GHz or higher at one or more wavelengths between 900 and 1200 nm;
   (ii) at least one multimode optical fiber optically coupled to said light source, said fiber comprises a graded index a graded index glass core, and a cladding comprising an outer cladding portion, wherein said fiber has an overfilled bandwidth at an operating wavelength situated in 900 nm to 1200 nm wavelength range greater than 4 GHz-km; an alpha less than about 2.08; and a dispersion magnitude less than 60 ps/nm/km and an attenuation less than 1.5 dB/km at said operating wavelength; and
   (iii) a detector optically coupled to said multimode optical fiber and capable of detecting a wavelength in 900 nm to 1200 nm; and wherein:
   a. said at least one light source is at least one VCSEL
   b. said cladding comprises an inner cladding surrounding and in contact with the core, a depressed-index annular portion surrounding the inner cladding portion, said depressed-index annular portion having a refractive index delta $\Delta 3_{MIN}$ less than about −0.2% and a width of at least 1 micron,
   c. said core has a radius greater than 10 microns and less than 28 microns, a maximum refractive index between 0.8 and 1.3%, and an alpha less than about 2.08; and
   d. said fiber has, an overfilled bandwidth greater than 4.7 GHz-km at one or more wavelengths between 940 and 1100 nm, a dispersion magnitude less than 60 ps/nm/km and an attenuation less than 1.5 dB/km; and
   e. said light source operates in 940 to 1100 nm range.

* * * * *